(12) United States Patent
Etzion

(10) Patent No.: US 11,023,872 B2
(45) Date of Patent: Jun. 1, 2021

(54) SYSTEMS FOR COLLECTING RETAILER-SPECIFIC DATA

(71) Applicant: My Opine LLC, Miami Beach, FL (US)

(72) Inventor: Rafael Etzion, Miami Beach, FL (US)

(73) Assignee: MY OPINE LLC, Miami Beach, FL (US)

( * ) Notice: Subject to any disclaimer, the term of this patent is extended or adjusted under 35 U.S.C. 154(b) by 226 days.

(21) Appl. No.: 16/391,082

(22) Filed: Apr. 22, 2019

(65) Prior Publication Data

US 2019/0251541 A1 Aug. 15, 2019

Related U.S. Application Data

(63) Continuation-in-part of application No. 15/345,199, filed on Nov. 7, 2016, now Pat. No. 10,269,002, which is a continuation of application No. 14/474,046, filed on Aug. 29, 2014, now Pat. No. 9,489,667.

(51) Int. Cl.

| | |
|---|---|
| *G06Q 20/20* | (2012.01) |
| *G06F 16/955* | (2019.01) |
| *G06K 19/06* | (2006.01) |
| *G06Q 30/06* | (2012.01) |
| *G06Q 20/32* | (2012.01) |
| *G07G 5/00* | (2006.01) |
| *G06K 1/12* | (2006.01) |

(52) U.S. Cl.
CPC ....... *G06Q 20/209* (2013.01); *G06F 16/9554* (2019.01); *G06K 1/121* (2013.01); *G06K 19/06009* (2013.01); *G06Q 20/202* (2013.01); *G06Q 20/3276* (2013.01); *G06Q 30/0635* (2013.01); *G07G 5/00* (2013.01)

(58) Field of Classification Search
CPC .............. G06Q 20/209; G06Q 20/202; G06Q 20/3276; G06Q 30/0635; G06F 16/9554; G06K 19/06009; G06K 1/121
See application file for complete search history.

(56) References Cited

U.S. PATENT DOCUMENTS

| | | |
|---|---|---|
| 4,954,699 A | 9/1990 | Coffey et al. |
| 8,231,047 B2 | 7/2012 | Canora |

(Continued)

FOREIGN PATENT DOCUMENTS

| | | |
|---|---|---|
| JP | 2010277290 | 12/2010 |
| JP | 2010277290 A | * 12/2010 |

*Primary Examiner* — Laura A Gudorf
(74) *Attorney, Agent, or Firm* — Neil G. J. Mothew

(57) ABSTRACT

A retail customer or event attendee can provide feedback specific to a retail location, event, or other desired association using an association-specific machine executable code printed on a transaction request at a retailer or event host. In some embodiments, a system may include a server subsystem and a processor module configured to provide a customer with a printed or electronic version of an association-specific machine-readable code. The association-specific machine-readable code may include a decodable instruction for interacting with a server subsystem to access an electronic platform configured to provide a respective association-specific request for information and receive and store response data received in response to the information request.

36 Claims, 9 Drawing Sheets

(56) References Cited

U.S. PATENT DOCUMENTS

| | | |
|---|---|---|
| 8,234,627 B2 | 7/2012 | Floyd et al. |
| 8,346,600 B2 | 1/2013 | Quinlan et al. |
| 8,413,882 B1 | 4/2013 | Nidamarthi et al. |
| 8,444,048 B1 | 5/2013 | Nidamarthi et al. |
| 8,504,410 B2 | 8/2013 | Pasta |
| 8,527,307 B2 | 9/2013 | Hamilton, II et al. |
| 8,595,061 B2 | 11/2013 | Falk et al. |
| 2001/0037206 A1 | 11/2001 | Falk et al. |
| 2009/0248532 A1 | 10/2009 | Sugiura |
| 2013/0191180 A1 | 7/2013 | Teo et al. |
| 2013/0282458 A1 | 10/2013 | Roberts et al. |
| 2014/0032347 A1 | 1/2014 | Argue et al. |
| 2014/0222545 A1 | 8/2014 | Hassan |
| 2014/0231502 A1 | 8/2014 | Johnson |
| 2014/0316906 A1* | 10/2014 | Cioffi ................ G06Q 30/0205 705/14.73 |
| 2014/0337098 A1 | 11/2014 | Ganesh et al. |

\* cited by examiner

SYSTEMS FOR COLLECTING RETAILER-SPECIFIC DATA

RELATED APPLICATIONS

This is a continuation-in-part of application Ser. No. 15/345,199, filed Nov. 7, 2016, which is hereby incorporated herein by reference, and which is a continuation of application Ser. No. 14/474,046, filed Aug. 29, 2014, which issued on Nov. 8, 2016, as U.S. Pat. No. 9,489,667, which is also hereby incorporated herein by reference.

TECHNICAL FIELD

This disclosure generally relates to systems for processing systems, and, more specifically, systems for processing a transaction request, such as a purchase order or event ticket, and collecting self-associating data.

BACKGROUND

Retailers may collect data from the purchases for various reasons, including customer service, satisfaction determination, or other reasons. Surveys and questionnaires have been used by various businesses to determine the opinions of consumers on various subject matters. For example, businesses have attempted to poll consumers' satisfaction on product offerings, quality, and pricing. Consumers' retail experience, such as customer service, retail environment, and delivery of products or services, also provides valuable insights for formulating business strategy.

Surveys and questionnaires can be provided verbally by a marketer through in-person encounters with the customer or through marketing calls, and the responses can be recorded by the marketer. Surveys and questionnaires can be provided on paper through mail. However, with the advance of electronic technologies, electronic surveys and questionnaires can provide greater efficiency if the systems for delivering the electronics surveys and questionnaires are designed to allow for easy user participation.

SUMMARY

Embodiments of the present disclosure include a method of managing feedback comprising storing an event record about an event in one or more network-based non-transitory storage devices having a collection of event records stored thereon; storing criteria including one or more rules for managing access to, and distribution of, the event records, wherein a first rule of the one or more rules applies to the event record; upon receiving a request by a user for approval for remote access to the event record, evaluating whether the request satisfies the criteria including the first rule; if the first rule is not satisfied, denying the user access to the event record; if the criteria including the first rule is satisfied, granting the user access to the event record, including sending an event-specific machine-readable code to the user, wherein the event-specific machine-readable code comprises an interpretable instruction for a mobile device to interact with the server module to access an electronic platform using a remote access protocol to receive an event-specific questionnaire from the electronic platform, and provide response data responsive to the event-specific questionnaire to the server module.

In some such embodiments, the event record includes location information that includes at least one geographical region. In some such embodiments, the method further comprises receiving location information from the user. In some such embodiments, the evaluating of the first rule includes determining whether the user is at the event based on the received location information received from the user and determining whether it is within the at least one geographical region of the event.

In some embodiments, the method further comprises receiving contact information for the user. In some such embodiments, the sending of the event-specific machine-readable code to the user includes sending the code in electronic form via at least one of an email, a Short Message Service (SMS) text message, a Multimedia Messaging Service (MMS) text message, an Instant Messaging (IM) message, or an "Over the Top" (OTT) application message.

According to some aspects of the present disclosure, a feedback management system comprises one or more network-based non-transitory storage devices for storing an event record about an event, the storage devices having a collection of event records stored thereon; and criteria including one or more rules for managing access to, and distribution of, the event records, wherein a first rule applies to the event record; a server for receiving a request by a user for approval for remote network access to the event record; one or more processors for evaluating whether the request satisfies the criteria including the first rule; if the first rule is not satisfied, denying the user access to the event record; if the criteria including the first rule is satisfied, granting the user access to the event record, including sending an event-specific machine-readable code to the user. In some such embodiments, the event-specific machine-readable code comprises an interpretable instruction for a mobile device to interact with the server module to access an electronic platform using a remote access protocol to receive an event-specific questionnaire from the electronic platform, and provide response data responsive to the event-specific questionnaire to the server module.

In some such embodiments, the event record includes location information that includes at least one geographical region. In some such embodiments, the one or more processors is configured for receiving location information from the user. In some such embodiments, the evaluating of the first rule includes determining whether the user is at the event based on the received location information received from the user and determining whether it is within the at least one geographical region of the event.

In some embodiments, the one or more processors is configured for receiving contact information for the user. In some such embodiments, the sending of the event-specific machine-readable code to the user includes sending the code in electronic form via at least one of an email, a Short Message Service (SMS) text message, a Multimedia Messaging Service (MMS) text message, an Instant Messaging (IM) message, or an "Over the Top" (OTT) application message.

According to some aspects of the present disclosure, a feedback management system comprises an event-host subsystem accessible to an attendee of an event, the event-host subsystem comprising a processor being configured to receive an event-related request from the attendee, and provide, to the attendee, a response to the event-related request; and provide, to the attendee, an event-specific machine-readable code with the response to the event-related request; wherein the event-specific machine-readable code comprises an interpretable instruction for a computing device to interact with a remote server to access an electronic platform using a remote access protocol, the electronic platform configured to request response data responsive to a request for attendee input and associate the response data with the event.

In some such embodiments, the electronic platform is configured to request the response data by presenting a questionnaire in connection with the event, the questionnaire being event-specific, transaction specific, or both.

In some such embodiments, the processor is further configured to provide an electronic copy of the event-specific machine-readable code.

In some such embodiments, the event-host subsystem further comprises a printing terminal for printing the event-specific machine-readable code on a transaction document.

In some such embodiments, the event-host module includes an attendee interface comprising at least one of a kiosk, a touchscreen display, and a mobile computing device.

In some embodiments, the attendee interface comprises a mobile computing device having a position acquisition device configured to determine a location of the mobile computing device.

In some embodiments, the event-specific machine-readable code further comprises interpretable location information based on the location of the mobile computing device.

In some embodiments, the electronic platform is further configured associate the response data with the location of the mobile computing device.

In some embodiments, the event includes traveling such that an event location changes during the event. In some such embodiments, the position acquisition device collects location information as the event location changes during the event, thereby generating an event route, and wherein the electronic platform is further configured associate the response data with the event route.

According to further aspects of the present disclosure, a server system for collecting event-specific response data comprises a server module that hosts at least a portion of an electronic platform, the electronic platform being accessible by a mobile computing device interpreting an event-specific machine-readable code, the event-specific machine-readable code comprises an interpretable instruction for interacting with the server module using a remote access protocol, the electronic platform being configured to request response data responsive to a request for attendee input; and a memory module for storing the response data in a database, the response data being associated in the database with the event.

In some such embodiments, the event-specific machine-readable code comprises location information, the location information being representative of an event location.

In some such embodiments, the machine-readable code is provided electronically to the mobile computing device.

In some such embodiments, the machine-readable code comprises at least one of a one-dimensional barcode, a two-dimensional bar code, and a combination of characters.

In some such embodiments, the server module is configured to host a first portion of the electronic platform, and the first portion of the electronic platform hosted by the server module is configured to cooperate with a second portion of the electronic platform hosted by the mobile computing device.

In some such embodiments, the electronic platform further comprises an administration portal for allowing an event host to set one or more reward conditions for identifying one or more reward recipients from among attendees that provided response data, wherein the server module is configured to execute the reward conditions, and the memory module is configured for storing data representative of the one or more reward recipients identified by the server module according to the reward conditions. In some such embodiments, at least one of the one or more reward recipients is notified of winning a reward in a real-time or deferred manner. In some such embodiments, the server module is configured to provide the data representative of reward recipients to the event host according to at least one of a batch processing procedure, a real-time processing procedure, and a near-real-time processing procedure. In some such embodiments, the server module is configured to provide reward redemption information to the one or more reward recipients.

In some embodiments, the server module comprises a notification subsystem for ending a notification to the event host when the response data has been stored in the database.

In some embodiments, the electronic platform further comprises an administration portal for allowing an event host to access the response data in the database. In some such embodiments, the server module is configured to host a first portion of the electronic platform, and wherein the first portion of the electronic platform hosted by the server module is configured to cooperate with a second portion of the electronic platform hosted by a host computing device, the host computing device configured to receive the notification. In some such embodiments, the administration portal is included in the second portion of the electronic platform hosted by the host computing device.

In some embodiments, the administration portal is configured to provide a plurality of access settings corresponding to a plurality of members of the event host.

These and other advantages of the present disclosure will become apparent to those skilled in the art from the following detailed description, the accompanying drawings, and the appended claims.

DETAILED DESCRIPTION

Figure 1:
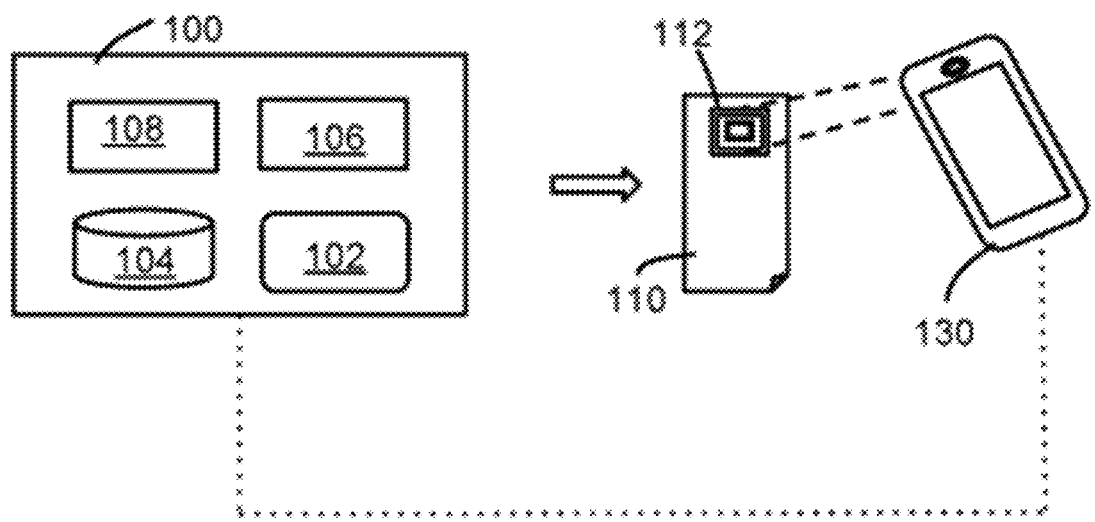
FIG. 1 is a schematic diagram illustrating an exemplary embodiment of a POS system, in accordance with the present disclosure.

Example embodiments will now be described hereinafter with reference to the accompanying drawings, which form a part hereof, and which illustrate example embodiments which may be practiced. As used in the disclosures and the appended claims, the terms "embodiment", "example embodiment", and "exemplary embodiment" do not necessarily refer to a single embodiment, although they may, and various example embodiments may be readily combined and interchanged, without departing from the scope or spirit of example embodiments. Furthermore, the terminology as used herein is for the purpose of describing example embodiments only and is not intended to be limitations. In this respect, as used herein, the term "in" may include "in" and "on", and the terms "a," "an" and "the" may include singular and plural references. Furthermore, as used herein, the term "by" may also mean "from", depending on the context. Furthermore, as used herein, the term "if" may also mean "when" or "upon," depending on the context. Furthermore, as used herein, the words "and/or" may refer to and encompass any and all possible combinations of one or more of the associated listed items.

The systems and methods disclosed herein make it possible to provide an association-specific request for information to confirmed customers and collect response data with minimized hassles. Non-limiting examples of association-specific requests can include retailer-specific requests and event-specific requests. For example, in some embodiments, systems and methods in accordance with the present disclosure allow for the collection of association-specific requests for information from confirmed customers, which can include collection of retailer-specific data from confirmed purchasers and event-specific data from confirmed event attendees. Advantageously, the association-specific data can be collected without requiring the customers to provide identifying information about themselves or their contact information, such as e-mails, phone number, or address or to go through a verification process, such as providing an order ticket number.

Retailer-specific data from confirmed purchasers can be very helpful to a retail business in evaluating its retail operation. A business may determine what is helping it attracting purchasers and what needs to be improved upon to bring back repeat purchasers. Event-specific data from confirmed event attendees can be very helpful to an event host in determining whether plans and expectations were met. An event host may determine what to continue doing and what to improve on for future events. Also, for either type of data, soliciting feedback can convey a positive impression of genuine care about the experience and satisfaction of customers.

As used herein, the term "event" may generally refer to any type of occurrence that involves at least one event host providing a service, for example by planning, organizing, scheduling, performing, and/or otherwise being responsible for at least some aspect of the event. Examples of events include, without limitation, a travel event, such as an airline flight, a cruise, or travel by train, bus, or automobile, a concert or sporting event, a conference, a trade show, a golf outing, or something impromptu or on-demand such as roadside assistance.

Various public forums and online websites are available to serve as a platform for the general public to provide reviews and feedback on various businesses and products. Such public forums and online websites, however, allow anyone in the public to write a review without verifying whether the reviewer is an authentic customer, such as an authentic retail customer or event attendee. For this reason, public reviews are often biased and unreliable. Accordingly, there is a need for a system to collecting data directly from confirmed customers.

One approach is described in U.S. Pat. App. Pub. No. 2013/0191180 to Teo et al. Teo teaches a system for collecting consumer feedback pertaining to particular products and services using a unique product code (UPC). Each product or service includes a UPC that is unique with respect to the other products and services. The UPC is found either on the product itself or on a pre-printed display that visually associates a UPC with a service. An online survey site can be encoded in the UPC, and the consumer can scan the UPC from the product or the pre-printed display for each product or service purchased and be taken to the online survey site for each product or service.

One limitation of Teo's UPC-based system is that its feedback collection is limited to feedback pertaining to the product or service itself; the collection of retailer-specific data would not be possible with Teo's UPC-based system. Teo encodes the online survey site into the UPC, but in doing so Teo would collect feedback on the same product sold in different retailers because the same products all have the same UPC. As such, the online survey site would be product-specific, but not retailer-specific.

Another limitation of Teo's UPC-based system is that it would allow potentially biased non-purchasers to access the online survey site. Products in a customary retail environment are placed in publicly accessible space, such as open shelves, so as to allow the consumers to browse the products. As such, anyone in the public may pick up the product and scan the UPC to access the online survey site without actually purchasing and using the products. Non-purchaser participation is especially an issue when an incentive is provided to participate in the survey. For example, producers have offered raffle tickets as an incentive for participating in a survey, but due to legal restrictions, purchase cannot be required. Such a survey would not be reliable as non-purchasers are actually incentivized to participate.

Yet another limitation of Teo's UPC-based system is that a consumer would have to go through unnecessary hassles and may be deterred from participating in the online survey. If the consumer purchased multiple products, the consumer would be required by Teo's UPC-based system to scan multiple UPCs and access multiple online survey sites. While this process may not be highly complicated, it is repetitive and involves more hassles than necessary. For purchasers who have no other motivation except his generosity to participate in feedback collection, the unnecessary hassles would make it less likely that the unmotivated purchasers would go through with the online survey. Additionally, the use of UPC on the product or on a pre-printed display creates even more hassle for the consumer. This is especially the case for a pre-printed display because the consumer cannot bring along the pre-printed display after purchase and thus cannot wait until a more convenient time later to scan the UPC; the consumer would be forced to respond before the product is consumed or service is received. Some products also may not be conveniently carried, and the consumer may not have the product to scan the UPC when it is a convenient to do so.

FIG. 1 is a schematic diagram illustrating a point-of-sale (POS) system 100 operable to collect association-specific data directly from the customer any time after purchase without requiring the customer's contact information or a verification process. An exemplary embodiment of the POS system 100 includes a processor module 102, an optional memory module 104 communicatively connected with the processor module 102, an input interface 106 communicatively connected with the processor module 102, and a printing terminal 108 communicatively connected with the process or module 102. The POS system 100 may be located at a retailer for goods or services, such as a supermarket, theater, auto-repair shop, bank, dry-cleaner, etc. Alternatively, the POS system 100 can be located at a place of business of an event host, or at a third party that provides remote access, for example via the Internet.

The processor module 102 may include one processor or computer or a plurality of processors or computers. The memory module 104 may include one memory element or a plurality of memory elements. The processor module 102 and memory module 104 may be implemented using a distributed computing environment or cloud computing environment.

In some embodiments, the POS system 100 may be configured to process a transaction request, such as a service request for a service provider, a ticket request for an event host, or a purchase order at a retailer, where a retailer may be any entity that provides services or goods. A transaction request may be associated with any business transaction, whether associated with a retailer or other business, including both free and paid business transactions. For example, a transaction request may be associated with a purchase of goods or services, event tickets, travel tickets, whether requested or accepted face-to-face or remotely, such as over the telephone or using an electronic device over a computer network; other examples include goods or services at a supermarket, a purchase of a movie ticket and the subsequent showing of the movie at a theater, a purchase of car maintenance or repair service, a financial transaction (e.g., deposit or withdrawal of funds), or a purchase of dry cleaning service, purchase of travel tickets (e.g., for travel via an airplane, a train, or a cruise ship), purchase of tickets to a concert or sporting event, registering for a conference, trade show, or group outing, requesting roadside assistance, or booking a vacation. While terms such as "purchase," "register," and "book" are used to provide examples, such examples are not to be construed as being limited to situations where the customer is exchanging money or other consideration for whatever the customer is receiving.

The input interface 106 may be configured to receive the transaction request at the retailer, and the processor module 102 may optionally be configured to generate order data related to the transaction request. The memory module 104 may optionally be configured to receive and store the order data. The order data may include a variety of information about the transaction request relevant to a retail operation, service provider, or event, such as products or services ordered, data, time, price, payment method, etc.

In operation, a customer may place an order with an operator (not shown) of the POS system 100, and the operator may enter the transaction request into the POS system 100 through the input interface 106. Alternatively, in a self-service retail environment, the customer may place the order through the input interface 106. In still further embodiments, the customer may vocally place the order through a device capable of voice recognition, for example a smart voice-controlled assistance device, such as Apple Ski, Microsoft Cortana, Google Assistant, Samsung Bixby, and/or Amazon Alexa.

In addition to the purchase order, the operator may optionally collect the customer's contact information and enter it into the POS system 100 through the input interface 106. Alternatively, in a self-service retail environment, the customer may optionally enter his contact information through the input interface 106. The customer's contact information may optionally be processed by the processor module 102 and stored in the memory module 104. It is to be appreciated that the collection of customer contact information is optional, and in some embodiments, POS system 100 may be configured without this functionality.

In some embodiments, the processor module 102 is configured to provide instruction to the printing terminal 108 for printing, at the retailer, an association-specific machine-readable code 112 on a transaction document 110 associated with the transaction request. The transaction document 110 may be any document that a retailer might provide to the customer to memorialize the transaction request, such as a receipt, order confirmation print out, or retail contracts/agreements (e.g., rental agreement) or any document that is provided to the customer in the ordinary course of business (e.g., movie tickets, vouchers, etc.).

The association-specific machine-readable code 112 may include a decodable instruction for interacting with the processor module 102 to access an electronic platform configured to provide an association-specific request for information. The association-specific code 112 may be any code known in the art that may be captured by an optical device and/or interpreted by a machine. In some embodiments, the association-specific code 112 may include a bar code, such as a one-dimensional or two-dimensional bar code. The decodable instruction encoded in the association-specific code 112 may include a website address (e.g., Uniform Resource Locator (URL)) where the electronic platform may be accessed.

The instruction in code 112 may be interpreted and executed by the customer's mobile computing device 130, which would allow the customer to interact with the processor module 102 to access an electronic platform. The customer's mobile computing device 130 may include but not limited to a smart phone, a PDA, a laptop computer, or any other suitable devices that would allow the customer to interpret the association-specific code 112. To interpret the code 112, the customer's mobile computing device 130 may include commercially available software or software provided by the retailer or a third party. The software may be, not is not limited to, a mobile device application or a computer program.

In some embodiments, the mobile computing device 130 may interact with the processor module 102 using any communication protocol known in the art. In an exemplary embodiment, the mobile computing device 130 and the processor module 102 may communicate using a remote access protocol known in the art. In another exemplary embodiment, the mobile computing device 130 and the processor module 102 may communicate using a "pull" protocol known in the art. The electronic platform may be accessed by the mobile computing device 130 in different ways. In some embodiments, the mobile computing device 130 may include a browser to access the electronic platform using a remote access protocol. In another embodiment, the mobile computing device 130 may include a mobile application and access the electronic platform by hosting it, either partially or entirely, on the mobile computing device 130.

In some embodiments, the mobile computing device 130 is further configured to allow the customer to provide the response data to the processor module 102. The response data may include customized response typed in by the customer or the customer's choice of preset options in the association-specific request for information.

The processor module 102 may be further configured to receive response data responsive to the association-specific request for information and associate the response data with an entity associated with either a location or an event or both. A "location" as discussed herein can include a wide range of granularities depending on the level of specificity desired. For example, a "location" can range from a specific retail location, or even an area within a retail location, such as an area surrounding a POS station or terminal, to a neighborhood or city or state or even larger region. The response data may optionally be stored in the optional memory module 104 for future access. In some embodiments, the processor module 102 may be further configured to associate the response data with the order data if available.

One of ordinary skill in the art would appreciate that the association-specific code 112 may be a unique retailer-specific code for a retailer having one or a plurality of points of sale either at the same location or different locations. In some embodiments, each point of sale may be considered as a different retailer and would have a different retailer-specific code 112. In this case, the feedback from the purchaser, which serves as an example of a customer in a retail environment, would reflect the retail experience at each particular point of sale. In another embodiment some or all points of sale of a retailer may be considered as a single retailer and would have the same retailer-specific code 112. In this case, the feedback from the purchaser would reflect the retail experience at the retailer without differentiating the different points of sale of the retailer.

For example, a department store may have a plurality of points of sale at the same location. In an exemplary embodiment, a different retailer-specific code 112 may be assigned to each point of sale. In another exemplary embodiment, the same retailer-specific code 112 may be assigned to a group or all of the points of sale. For example, each floor or each department of the department store may be assigned the same retailer-specific code 112.

One of ordinary skill in the art would also appreciate that the association-specific request for information may be presented in various forms depending on the purpose for the information requested. In some embodiments, the association-specific request for information may include a customized questionnaire. In some embodiments, the association-specific request for information may include a blank or partially-filled fillable form or both. In an exemplary, the association-specific request for information may include a menu of preset response options. The use of association-specific code 112 allows for a number of customizations of the questions, including but not limiting to customization based on retailers or retailer locations.

It is to be appreciated that printing the association-specific code 112 on the transaction document 110 at the retailer makes it more likely that only the actual customer would receive the association-specific code 112 without the hassle of collecting customer's contact information. Collecting the customer's contact information may cause a delay in retail operation, and, due to privacy concerns or the inconvenience involved, a customer may decline to provide contact information. The transaction document 110 comprising the association-specific code 112 allows for a convenient vehicle for the customer to keep the association-specific code 112 with him for accessing the electronic platform at a convenient time.

In some embodiments, the association-specific code 112 may be both retailer-specific and transaction-specific such that a different code 112 may be assigned to each transaction. For example, not only different codes 112 may be assigned to different retailers, the different transactions at the same retailers may also be assigned different codes 112. The use of a code 112 that is both retailer-specific and transaction-specific may have particular synergy in embodiments in which order data is collected as discussed above. In an exemplary embodiment, the transaction-specific and retailer-specific code 112 may include a decodable instruction for interacting with the processor module 102 to access an electronic platform configured to provide a transaction-specific and retailer-specific request for information. The use of the transaction-specific and retailer-specific code 112 allows for a number of customizations of the transaction-specific and retailer-specific request for information based on the order data. This customization of the transaction-specific and retailer-specific request for information may be used in a customer service context in which the request for information may be a blank or partially-filled fillable form or both.

An example is provided herein to illustrate an exemplary operation of the POS system 100. In an exemplary embodiment, a transaction request for a car rental may be processed by the POS system 100 at a car rental agency. Order data, such as the rental car license plate, make/model, or color, may be optionally generated by the processor module 102 and stored in the optional memory module 104. The processor module 102 may instruct the printing terminal 108 to print a transaction-specific and retailer-specific code 112 on the leasing agreement 110. Using a mobile computing device 130, the customer may capture and interpret the code 112 to access an electronic platform configured to provide a transaction-specific and retailer-specific request for information. The electronic platform may be accessed from the mobile computing device 130 using a browser or other suitable software. The request for information may include one or more forms that are empty, prefilled, or both. prefilled using the order data and a preset option for confirming the prefilled data is correct. The customer may send a response data to the processor module 102 by choosing the preset option to verify. Upon verification, a customer service event may be initiated, such as, locating the rental car via a position acquisition device, such as cell-phone triangulation or GPS, and sending verified order data to a roadside assistance responder for roadside service at the rental car location.

One of ordinary skill in the art would appreciate the efficiency in customer service that may be realized by the synergistic use of the retailer-specific and transaction-specific code 112 in embodiments in which order data is generated. In an aspect, the transaction-specific code 112 allows for reduced errors in written and oral communications between the purchaser and the retailer while customer service is being delivered. Also, it improves the time and accuracy of providing customer service.

One of ordinary skill in the art would appreciate that the association-specific code 112 may be a unique event-specific code for an event host, such as an event planner, a travel agent, ticket broker, or any other kind of service provider. An event host can have one or more event managers and can offer one or more different types of events. For example, in some embodiments, an event host can be a travel agency that has several travel agents that serve as examples of event managers. A customer who booked a vacation using a certain travel agent can later enter an event-specific event code that is associated with both the customer's itinerary and the specific travel agent who prepared the itinerary. In this case, the feedback from the customer would reflect their event-related experience with the booked vacation and with the travel agent who worked with the customer to prepare the itinerary. In another embodiment some or all event managers may be considered as a single event host and would have the same event-specific code 112. In this case, the feedback from the customer would reflect the event experience without differentiating the different travel agents at the travel agency.

For example, a production company may have a plurality of producers who all produce similar types of events, such as music concerts. In an exemplary embodiment, a different event-specific code 112 may be assigned to each producer. In another exemplary embodiment, the same event-specific code 112 may be assigned to a group or all of the producers working for a production company. For example, where a production company produces several different types of events, such as music concerts and festivals, each different event may be assigned the same event-specific code 112.

One of ordinary skill in the art would also appreciate that the association-specific request for information may be presented in various forms depending on the purpose for the information requested. In some embodiments, the association-specific request for information may include a customized questionnaire. In some embodiments, the association-specific request for information may include a blank or partially-filled fillable form or both. In an exemplary, the association-specific request for information may include a menu of preset response options. The use of association-specific code 112 allows for a number of customizations of the questions, including but not limiting to customization based on event hosts' event managers or groups of event managers who work for a common event sub-group.

It is to be appreciated that printing the association-specific code 112 on the transaction document 110 can be accomplished at the time the event is booked, for example on an event ticket or a travel itinerary or other document. Alternatively, the printing can be optional. In such embodiments, the code 112 may not be printed, but instead can be delivered to the customer electronically, for example via email, text message, or phone application.

In some embodiments, the association-specific code 112 may be both event-specific and transaction-specific such that a different code 112 may be assigned to each transaction. For example, not only different codes 112 may be assigned to different event hosts, the different transactions at the same event hosts may also be assigned different codes 112. The use of a code 112 that is both event-specific and transaction-specific may have particular synergy in embodiments in which order data is collected as discussed above. In an exemplary embodiment, the transaction-specific and event-specific code 112 may include a decodable instruction for interacting with the processor module 102 to access an electronic platform configured to provide a transaction-specific and event-specific request for information. The use of the transaction-specific and event-specific code 112 allows for a number of customizations of the transaction-specific and event-specific request for information based on the order data. This customization of the transaction-specific and event-specific request for information may be used in a customer service context in which the request for information may be a blank or partially-filled fillable form or both.

An example is provided herein to illustrate an exemplary operation of the POS system 100 for event-specific requests for information. In an exemplary embodiment, a transaction request for a concert production may be processed by the POS system 100. Order data, such as the performer, venue, and performance date may be optionally generated by the processor module 102 and stored in the optional memory module 104. The processor module 102 may either instruct the printing terminal 108 to print a transaction-specific and retailer-specific code 112 on the production contract 110 or may send it electronically to the customer via text message or email. Using a mobile computing device 130, the customer may capture and interpret the code 112 to access an electronic platform configured to provide a transaction-specific and event-specific request for information. The electronic platform may be accessed from the mobile computing device 130 using a browser or other suitable software. The request for information may include a form prefilled using the order data and a preset option for confirming the prefilled data is correct. The customer may send a response data to the processor module 102 by choosing the preset option to verify. Upon verification, a customer technical services event may be initiated, such as, setup and operation of audio/visual equipment during the event and sending technical staff to perform these tasks for the booked concert. The customer can provide feedback related to the concert as event-specific feedback and feedback related to the technical support staff as transaction-specific feedback.

One of ordinary skill in the art would appreciate the efficiency in customer service that may be realized by the synergistic use of the event-specific and transaction-specific code 112 in embodiments in which order data is generated. In an aspect, the transaction-specific code 112 allows for reduced errors in written and oral communications between the purchaser and the event host while customer service is being delivered. Also, it improves the time and accuracy of providing customer service.

Figure 2:
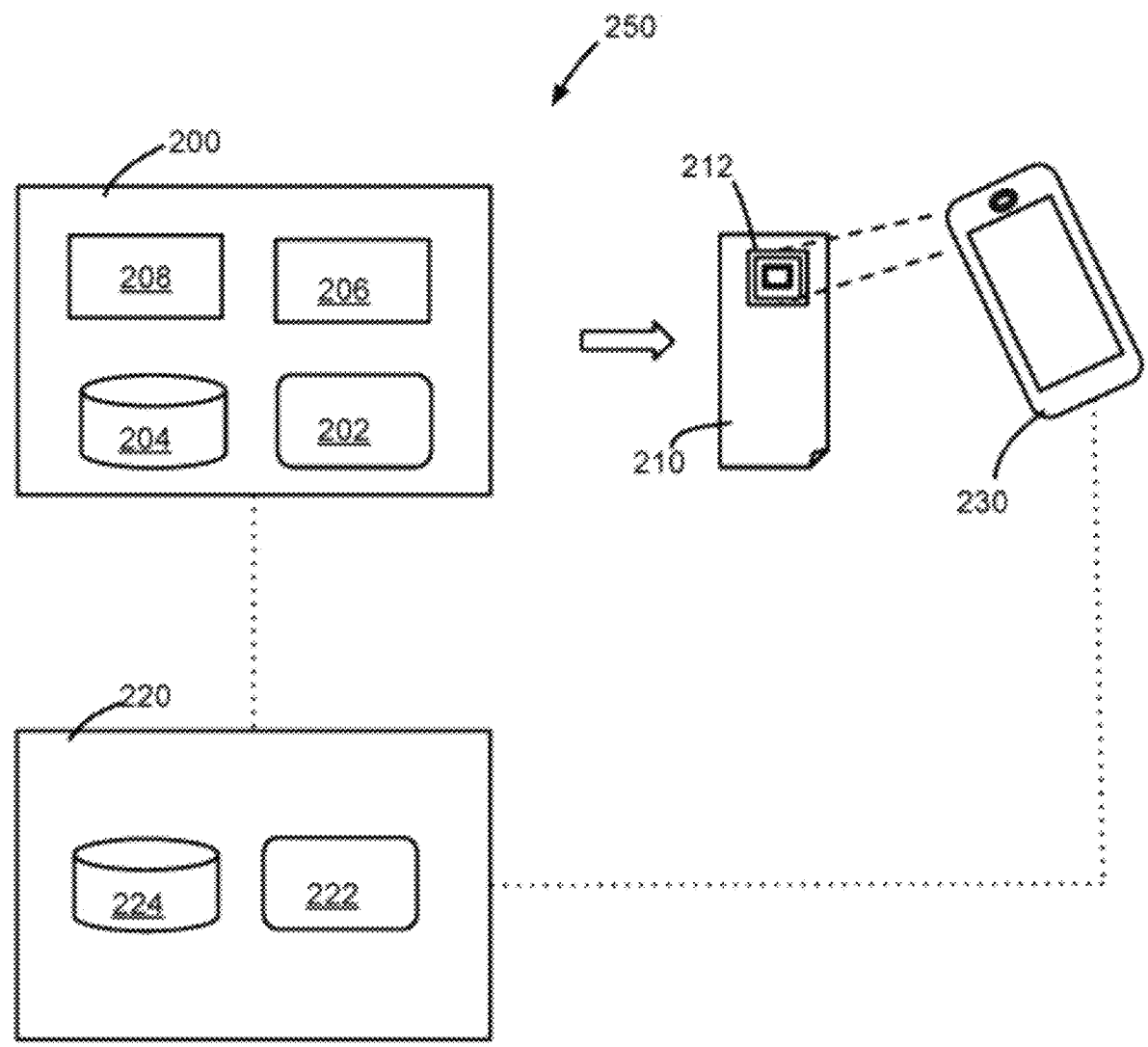
FIG. 2 is a schematic diagram illustrating an exemplary embodiment of a system comprising a POS subsystem and a server subsystem, in accordance with the present disclosure.

FIG. 2 is a schematic diagram illustrating a system 250 operable to process transaction requests and collect response data. The system 250 can include a point-of-sale (POS) subsystem that can be located at a retailer and a server subsystem 220.

An exemplary embodiment of the POS subsystem 200 includes a processor module 202, an optional memory module 204 communicatively connected with the processor module 202, an input interface 206 communicatively connected with the processor module 202, and a printing terminal 208 communicatively connected with the processor module 202. Similar to the POS system 100, the POS subsystem 200 may be located at a retailer for goods or services, such as a supermarket, theater, auto-repair shop, bank, dry-cleaner, etc. The processor module 202 may include one processor or computer or a plurality of processors or computers. The optional memory module 204 may include one memory element or a plurality of memory elements. The processor module 202 and optional memory module 204 may be implemented using a distributed computing environment or cloud computing environment.

An exemplary embodiment of the server subsystem 220 includes a server module 222 and an optional memory module 224 in communication with the server module 222. The server subsystem 220 may be located remotely away from the retailer in one or more locations or in the Cloud. In some embodiments, the server module 222 may actually be a set of networked servers but is shown in FIG. 2 as a single server for illustration purposes only. The optional memory module 224 may include one memory element or a plurality of memory elements.

The server subsystem 220 and the POS subsystem 200 may be communicatively connected over a wide area network (WAN), local area network (LAN), optic fiber, cable channel, satellite network, cellular network, radio network, infrared link, the Cloud, the Internet, or any other wired or wireless communication connection known in the art.

In some embodiments, the POS system 200 may be configured to process a transaction request, such as a service request for a service provider, a ticket request for an event host, or a purchase order at a retailer, which where a retailer may be any entity that provides services or goods. A transaction request, as described above with respect to the POS systems 100, may be associated with any business transaction, whether associated with a retailer or other business, including both free and paid business transactions. For example, a purchase order transaction request may be associated with a purchase of goods or services, event tickets, travel tickets, whether requested or accepted face-to-face or remotely, such as over the telephone or using an electronic device over a computer network; other examples include goods or services at a supermarket, a purchase of a movie ticket and the subsequent showing of the movie at a theater, a purchase of car maintenance or repair service, a financial transaction (e.g., deposit or withdrawal of funds), or a purchase of dry cleaning service, purchase of travel tickets (e.g., for travel via an airplane, a train, or a cruise ship), purchase of tickets to a concert or sporting event, registering for a conference, trade show, or group outing, requesting roadside assistance, or booking a vacation. While terms such as "purchase," "register," and "book" are used to provide examples, such examples are not to be construed as being limited to situations where the customer is exchanging money or other consideration for whatever the customer is receiving.

The input interface 206 may be configured to receive the transaction request at the retailer, event host, or remotely, such as via telephone or the Internet, and the processor module 202 may optionally be configured to generate order data related to the transaction request. In some embodiments, the memory module 204 may optionally be configured to receive and store the order data. The order data may include a variety of information about the transaction request relevant to retail operation, such as the products or services ordered, data, time, price, payment method, etc. In another embodiment, the order data may be transmitted to the server subsystem 220, in which the memory module 224 optionally be configured to receive and store the order data.

In operation, a customer may place an order with an operator (not shown) of the POS subsystem 200, and the operator may enter the transaction request into the POS subsystem 200 through the input interface 206. Alternatively, in a self-service retail or event environment, the customer may place the order through the input interface 206. In still further embodiments, the customer may vocally place the order through a device capable of voice recognition, for example a smart voice-controlled assistance device, such as Apple Siri, Microsoft Cortana, Google Assistant, Samsung Bixby, and/or Amazon Alexa.

In addition to the purchase order, the operator may optionally collect the customer's contact information and enter it into the POS subsystem 200 through the input interface 206. Alternatively, in a self-service retail or event environment, the customer may optionally enter his contact information through the input interface 206. In some embodiments, the customer's contact information may optionally be processed by the processor module 202 and stored in the memory module 204. In another embodiment, the customer's contact information may optionally be processed by the processor module 202 and transmitted to the server subsystem 220, in which the customer's contact information may be stored in the optional memory module 224. It is to be appreciated that the collection of customer contact information is optional, and in some embodiments, POS subsystem 200 may be configured without this functionality.

In some embodiments, the processor module 202 is configured to provide an association-specific machine-readable code 212 to the customer electronically, for example via email or text message, or to provide instruction to the printing terminal 208 for printing, at the retailer or event host, an association-specific machine-readable code 212 on a transaction document 210 associated with the transaction request. The transaction document 210 may be any document that a retailer or event host might provide to the customer in the ordinary course of business to memorialize the transaction request, such as a receipt, order confirmation print out, or retail contracts/agreements (e.g., rental agreement) or any document that is provided to the customer in the ordinary course of business (e.g., movie tickets, vouchers, etc.).

The association-specific machine-readable code 212 may include a decodable instruction for interacting with the server module 222 to access an electronic platform configured to provide an association-specific request for information. The association-specific code 212 may be any code known in the art that may be captured by an optical device and/or interpreted by a machine. In some embodiments, the association-specific code 212 may include a bar code, such as a one-dimensional or two-dimensional bar code. The decodable instruction encoded in the association-specific code 212 may include a website address (e.g., URL) where the electronic platform may be accessed.

The instruction in code 212 may be interpreted and executed by the customer's mobile computing device 230, which would allow the customer to interact with the server module 222 to access the electronic platform. The customer's mobile computing device 230 may include but not limited to a smart phone, a PDA, a laptop computer, or any other suitable devices that would allow the customer to interpret the association-specific code 212. To interpret the code 212, the customer's mobile computer device 230 may include commercially available software or software provided by the retailer or a third party. The software may be, not is not limited to, a mobile device application or a computer program.

In some embodiments, the mobile computing device 230 may interact with the server module 222 using any communication protocol known in the art. In an exemplary embodiment, the mobile computing device 230 and the server module 222 may communicate using a remote access protocol known in the art. In another exemplary embodiment, the mobile computing device 230 and the server module 222 may communicate using a "pull" protocol known in the art. The electronic platform may be accessed by the mobile computing device 230 in different ways. In some embodiments, the mobile computing device 230 may include a browser to access the electronic platform using a remote access protocol. In another embodiment, the mobile computing device 230 may include a mobile application and access the electronic platform by hosting it, either partially or entirely, on the mobile computing device 230.

In some embodiments, the mobile computing device 230 is further configured to allow the customer to provide the response data to the server module 222. The response data may include customized response typed in by the customer or the customer's choice of preset options in the electronic platform.

The server module 222 may be further configured to receive the response data responsive to the association-specific request for information and associate the response data with the retailer or event host. The response data may optionally be stored in the optional memory module 224 for future access. In some embodiments, the server module 222 may be further configured to associate the response data with the order data if available.

One of ordinary skill in the art would appreciate that the association-specific code 212 may be a unique retailer-specific code for a retailer having one or a plurality of points of sale either at the same location or different locations. In some embodiments, each point of sale may be considered as a different retailer and would have a different retailer-specific code 212. In this case, the feedback from the purchaser would reflect the retail experience at each particular point of sale. In another embodiment some or all points of sale of a retailer may be considered as a single retailer and would have the same retailer-specific code 212. In this case, the feedback from the purchaser would reflect the retail experience at the retailer without differentiating the different points of sale of the retailer.

For example, a department store may have a plurality of points of sale at the same location. In an exemplary embodiment, a different retailer-specific code 212 may be assigned to each point of sale. In another exemplary embodiment, the same retailer-specific code 212 may be assigned to a group or all of the points of sale. For example, each floor or each department of the department store may be assigned the same retailer-specific code 212.

One of ordinary skill in the art would appreciate that the association-specific code 212 may be a unique event-specific code for an event host, such as an event planner, a travel agent, ticket broker, or any other kind of service provider. An event host can have one or more event managers and can offer one or more different types of events. For example, in some embodiments, an event host can be a travel agency that has several travel agents that serve as examples of event managers. A customer who booked a vacation using a certain travel agent can later enter an event-specific event code that is associated with both the customer's itinerary and the specific travel agent who prepared the itinerary. In this case, the feedback from the customer would reflect their event-related experience with the booked vacation and with the travel agent who worked with the customer to prepare the itinerary. In another embodiment some or all event managers may be considered as a single event host and would have the same event-specific code 212. In this case, the feedback from the customer would reflect the event experience without differentiating the different travel agents at the travel agency.

For example, a production company may have a plurality of producers who all produce similar types of events, such as music concerts. In an exemplary embodiment, a different event-specific code 212 may be assigned to each producer. In another exemplary embodiment, the same event-specific code 212 may be assigned to a group or all of the producers working for a production company. For example, where a production company produces several different types of events, such as music concerts and festivals, each different event may be assigned the same event-specific code 212.

It is to be appreciated that while only one POS subsystem 200 is shown in FIG. 2, the system 250 may be adapted to include a plurality of POS subsystems.

Figure 3:
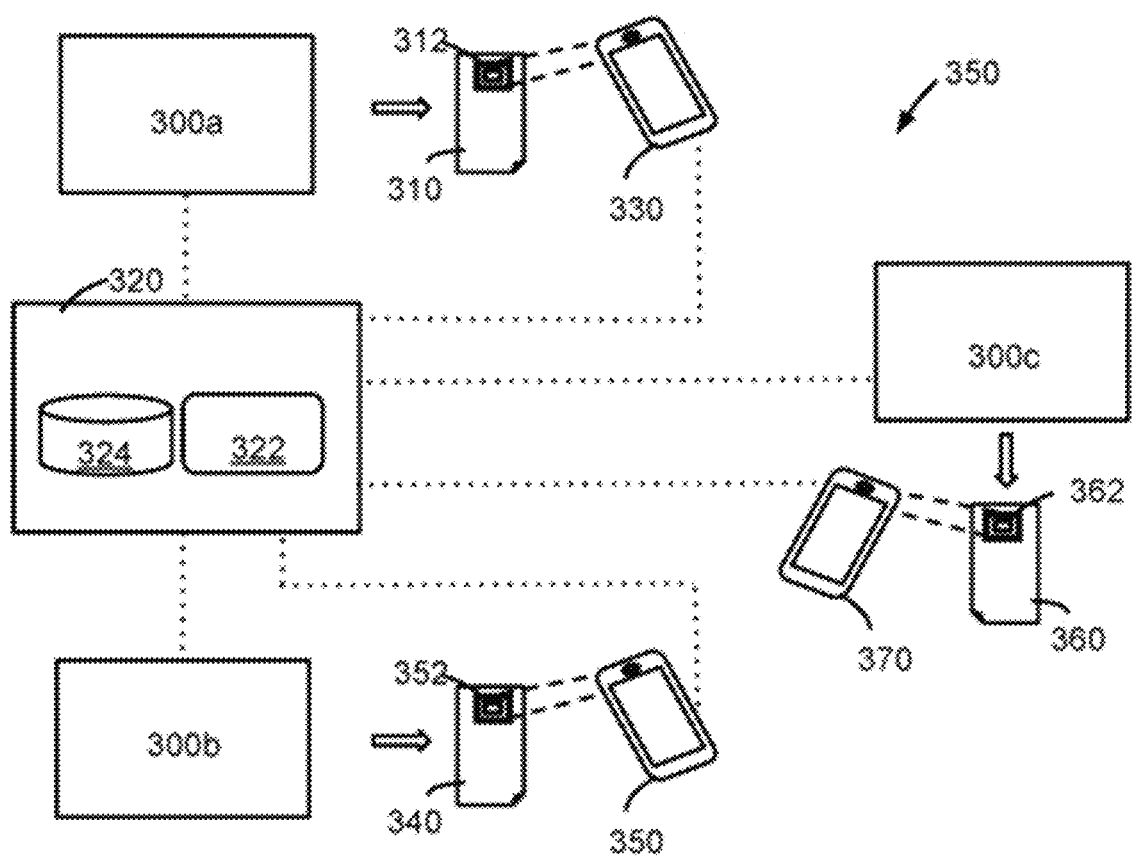
FIG. 3 is a schematic diagram illustrating an exemplary embodiment of a system comprising a plurality of POS subsystem and a server subsystem, in accordance with the present disclosure.

FIG. 3 is a schematic diagram illustrating a system 350 that is the same as the system 250 in FIG. 2 as described above except the system 350 includes a plurality of POS subsystems 300 *a*, 300 *b*, and 300 *c* that are the same as the POS subsystem 200 in FIG. 2 as described above. The POS subsystems 300 *a*, 300 *b*, and 300 *c* may each be located at a different retailer, place of business of an event host, or at a third party that provides remote access, for example via the Internet. Referring to FIGS. 2 and 3, the POS subsystems 300 *a*, 300 *b*, and 300 *c* each may include an order input interface 206 configured to receive a transaction request at the respective retailer or event host, a processor module 202 in communication with the order input interface 206, and a printing terminal 208 in communication with the processor module 202. The respective processor module 202 of the POS subsystems 300*a*, 300*b*, and 300*c* may be configured to optionally provide instruction to the respective printing terminal 208 for printing or for sending the customer an electronic copy of an association-specific machine-readable code 312, 352, or 362 on a transaction document 310, 340, or 360 associated with the transaction request, respectively. The server subsystem 320 may include a server module 322. In some embodiments, the association-specific machine-readable codes 312, 352, and 362 each comprise a decodable instruction for interacting with the server module 322 to access an electronic platform configured to provide a respective association-specific request for information. The instruction in codes 312, 352, and 362 may be interpreted and executed by the customers' mobile computing devices 330, 350, and 370, respectively, which would allow the customers to interact with the respective processor module 202 of the POS subsystems 300*a*, 300*b*, and 300*c* to access the electronic platform. The server module 322 is configured to receive response data responsive to the respective association-specific requests for information from the mobile computing devices 330, 350, and 370. The server module 322 may associate the response data with the respective event or retail and store the response data in an optional memory module 324 of the server subsystem 320.

One of ordinary skill in the art would appreciate that, in systems 250 and 350, the association-specific request for information may be presented in various forms depending on the purpose for the information requested. In some embodiments, the association-specific request for information may include a customized questionnaire. In some embodiments, the association-specific request for information may include a blank or partially-filled fillable form or both. In an exemplary embodiment, the association-specific request for information may include a menu of preset response options. The use of association-specific codes 212, 312, 352, or 362 allow for a number of customizations of the questions, including but not limiting to customization based on event hosts, events, retailers or retailer locations.

It is to be appreciated that printing the association-specific codes 212, 312, 352, or 362 on the transaction documents 210, 310, 350, or 360, respectively, at the retailers makes it more likely that only the actual customers would receive the association-specific code codes 212, 312, 352, or 362 without the hassle of collecting purchases' contact information. Collecting the customer's contact information may cause a delay in retail operation, and, due to privacy concerns or the inconvenience involved, a customer may decline to provide contact information. The transaction documents 210, 310, 340, and 360 comprising the association-specific code 212, 312, 352, 362, respectively, allow for a convenient vehicle for the customers to keep the association-specific codes 212, 312, 352, or 362 with them for accessing the electronic platform at a convenient time.

In some embodiments, the association-specific codes 212, 312, 352, or 362 may be both retailer-specific and transaction-specific such that a different code 212, 312, 352, or 362 may be assigned to each transaction. For example, not only different codes 212 may be assigned to different retailers, the different transactions at the same retailers may also be assigned different codes 212. The use of codes 212, 312, 352, or 362 that are both retailer-specific and transaction-specific may have particular synergy in embodiments in which order data is collected as discussed above. In an exemplary embodiment, the transaction-specific and retailer-specific code 212 may include a decodable instruction for interacting with the server module 220 to access an electronic platform configured to provide a transaction-specific and retailer-specific request for information. The use of the transaction-specific and retailer-specific code 212 allows for a number of customizations of the transaction-specific and retailer-specific request for information based on the order data. This customization of the transaction-specific and retailer-specific request for information may be used in a customer service context in which the request for information may be a blank or partially-filled fillable form or both.

An example is provided herein to illustrate an exemplary operation of the POS system 200. In an exemplary embodiment, a transaction request of a car rental may be processed by the POS system 200 at a car rental agency. Order data, such as the rental car license plate, make/model, or color, may be optionally generated by the processor module 202 and stored in the optional memory module 204. The processor module 202 may instruct the printing terminal 208 to print a transaction-specific and retailer-specific code 212 on the leasing agreement 210. Using a mobile computing device 230, the customer may scan and interpret the code 212 to interface with a server module 222 and access an electronic platform configured to provide a transaction-specific and retailer-specific request for information. The electronic platform may be accessed from the mobile computing device 230 using a browser or other suitable software. The request for information may include a form prefilled using the order data and a preset option for confirming the prefilled data is correct. The customer may send a response data to the server module 222 by choosing the preset option to verify. Upon verification, a customer service event may be initiated, such as, locating the rental car via a position acquisition device, such as cell-phone triangulation or GPS, and sending the verified order data to a roadside assistance responder for roadside service at the rental car location.

One of ordinary skill in the art would appreciate the improvement in customer service that may be realized by the synergistic use of the retailer-specific and transaction-specific code 212, 312, 352, or 362 in embodiments in which order data is generated. In an aspect, the transaction-specific code 212 allows for reduced errors in written and oral communications between the purchaser and the retailer while customer service is being delivered. Also, it improves the time and accuracy of providing customer service.

In some embodiments, the association-specific codes 212, 312, 352, or 362 may be both event-specific and transaction-specific such that a different code 212, 312, 352, or 362 may be assigned to each transaction. For example, not only different codes 212 may be assigned to different event hosts, the different transactions at the same event hosts may also be assigned different codes 212. The use of codes 212, 312, 352, or 362 that is both event-specific and transaction-specific may have particular synergy in embodiments in which order data is collected as discussed above. In an exemplary embodiment, the transaction-specific and event-specific code 212 may include a decodable instruction for interacting with the processor module 202 to access an electronic platform configured to provide a transaction-specific and event-specific request for information. The use of the transaction-specific and event-specific code 212 allows for a number of customizations of the transaction-specific and event-specific request for information based on the order data. This customization of the transaction-specific and event-specific request for information may be used in a customer service context in which the request for information may be a blank or partially-filled fillable form or both.

An example is provided herein to illustrate an exemplary operation of the POS system 200 for event-specific requests for information. In an exemplary embodiment, a transaction request for a concert production may be processed by the POS system 200. Order data, such as the performer, venue, and performance date may be optionally generated by the processor module 202 and stored in the optional memory module 204. The processor module 202 may either instruct the printing terminal 208 to print a transaction-specific and retailer-specific code 212 on the production contract 210 or may send it electronically to the customer via text message or email. Using a mobile computing device 230, the customer may capture and interpret the code 212 to access an electronic platform configured to provide a transaction-specific and event-specific request for information. The electronic platform may be accessed from the mobile computing device 230 using a browser or other suitable software. The request for information may include a form prefilled using the order data and a preset option for confirming the prefilled data is correct. The customer may send a response data to the processor module 202 by choosing the preset option to verify. Upon verification, a customer technical services event may be initiated, such as, setup and operation of audio/visual equipment during the event and sending technical staff to perform these tasks for the booked concert. The customer can provide feedback related to the concert as event-specific feedback and feedback related to the technical support staff as transaction-specific feedback.

One of ordinary skill in the art would appreciate the efficiency in customer service that may be realized by the synergistic use of the event-specific and transaction-specific code 212, 312, 352, or 362 in embodiments in which order data is generated. In an aspect, the transaction-specific code 212 allows for reduced errors in written and oral communications between the purchaser and the event host while customer service is being delivered. Also, it improves the time and accuracy of providing customer service.

Figure 4:
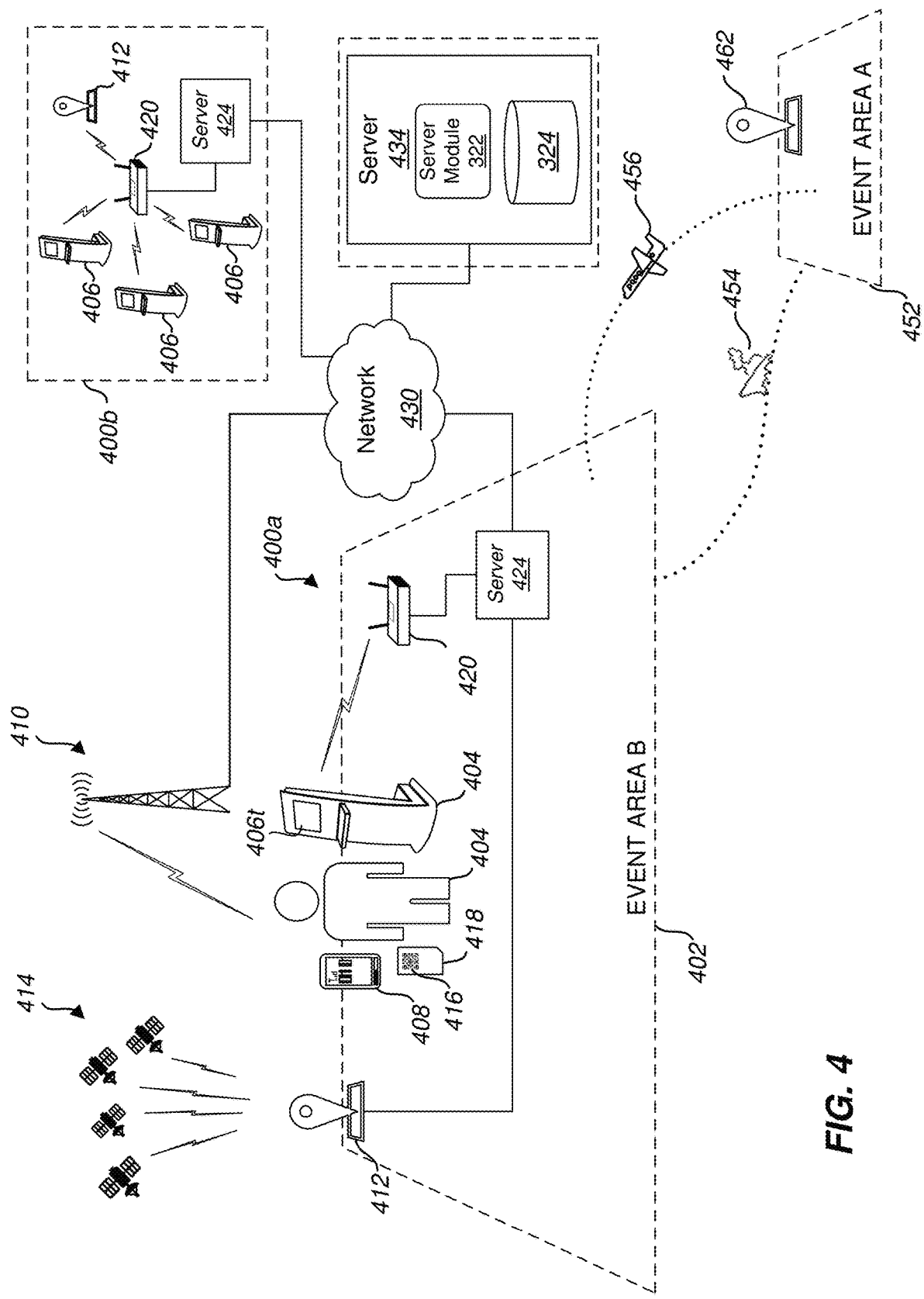
FIG. 4 is a schematic block diagram illustrating an exemplary embodiment of an event that includes a system for collecting event-specific response data.

FIG. 4 shows a schematic block diagram of an exemplary operation for managing event-specific requests for information made through a feedback management system 400. In some embodiments, the feedback management system 400 can be configured to manage event-specific feedback for free events, paid events, or combinations thereof, including events that were free to some attendees and required an entrance fee from other attendees, and including events that had some elements that were free and other elements that were not free. The feedback management system 400 can be configured to manage event-specific feedback from event attendees, which are referred herein as customers 404 regardless of whether they attended paid or free events. Also, as shown in FIG. 4, multiple instances of the feedback management system 400 can be independently deployed to different events or venues. In the illustrated embodiment, first and second feedback management systems 400a and 400b have been deployed for collecting response data at respective different events or venues.

As shown in FIG. 4, the event may take place in some geographic area, such as EVENT AREA B 402. Alternatively, the event may involve travel, so there may be more than one geographic area associated with the event. For example, the event may involve travel from EVENT AREA A 452 to EVENT AREA B 402, such as by airplane 454 or cruise ship 456. Such embodiments can include an additional request for transaction-specific data if the customer paid for the travel portion of the event. Such embodiments can also include a request for event-specific data for the time period when the customer attends the free event after travel is completed. In some embodiments, the event may involve activity at EVENT AREA A 452, which includes a position acquisition device 462, such as a second GPS receiver or a cell phone capable of determining its location using cell phone towers and/or WiFi signals. The position acquisition device 462 can be used to verify whether a customer took part in activities at EVENT AREA A 452 (e.g., by instructing customers to collect event-specific documents at EVENT AREA A 452) and/or can be used to verify whether the location for EVENT AREA A was as expected.

In some embodiments where a customer 404 pays to attend an event, any of the embodiments of POS systems described herein can be used to collect event-specific data from a customer 404. Alternatively, a feedback management system 400 can be used to collect event-specific data from a customer 404.

Figure 5:
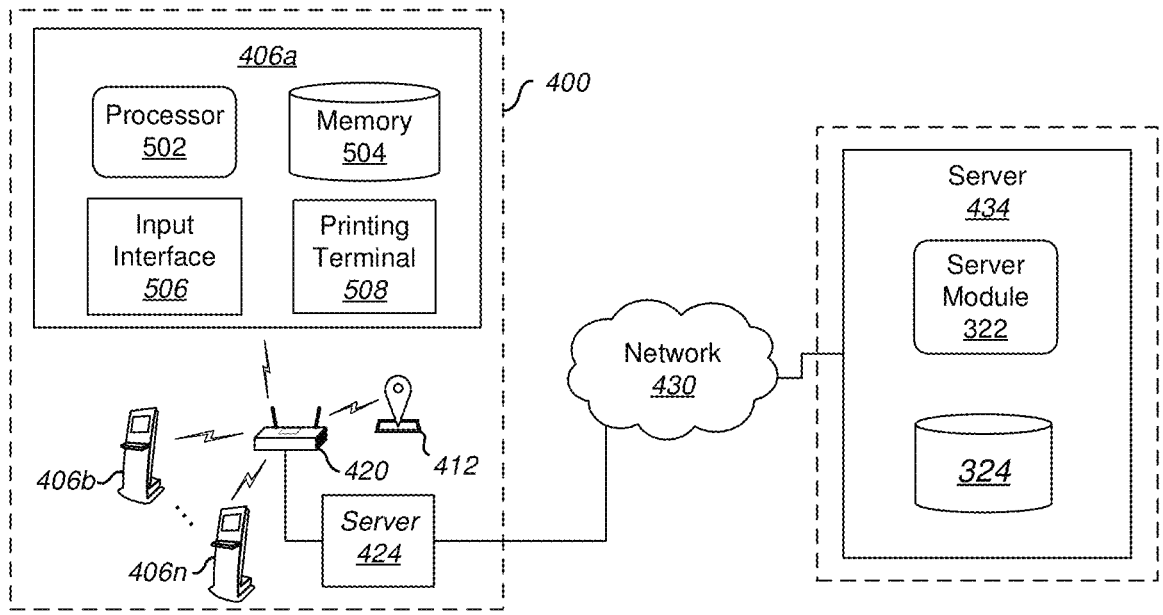
FIG. 5 shows a schematic block diagram of an embodiment of a feedback management system.

FIG. 5 shows a schematic diagram illustrating some embodiments of a feedback management system 400. The feedback management system 400 will now be described with reference to FIGS. 4 and 5. The feedback management system 400 is operable to collect event-specific data directly from the customer 404 any time during or after an event without requiring the customer's contact information or a verification process. The exemplary embodiment shown in FIG. 4 of the feedback management system 400 includes a device 406, illustrated in FIG. 4 as a kiosk 406, having a touchscreen monitor 406t for customer interaction, a feedback system server 424, a computer-network router 420, and a position acquisition device 412, such as a GPS receiver or a cell phone capable of determining its location using cell phone towers and/or WiFi signals. The device 406 includes a processor module 502, an optional memory module 504 communicatively connected with the processor module 502, an input interface 506 communicatively connected with the processor module 502, and a printing terminal 508 communicatively connected with the process or module 502.

While embodiments of the feedback management system 400 are described as including a device 406 embodied as a kiosk 406, alternative embodiments of the device 406 can instead include any electronic device with a display and input device, such as a mobile computing device, for example a smart phone or a tablet computer, a touchscreen display, or a desktop or laptop computer available for public or customer use, for example in a library or hotel business center.

The operations performed by these modules can be consolidated and/or combined in many ways, and some operations can be performed remotely such that some or all operations can be performed in one location or distributed among a plurality of locations. Thus, the feedback management system 400, or at least a portion thereof, may be located at, or accessible from, an event or a location associated with the event. For example, if the event is a concert, the feedback management system 400 can be at least partially located at the concert venue or can be accessible from the concert venue, for example via the customer's mobile computing device 408. As another example, if the event is an airline flight, the feedback management system 400 can be at least partially located on the airplane or at an airport that is at least one of the flight's destinations or can be accessible to the customer 404 on the airplane or at an airport that is at least one of the flight destinations, for example via the customer's mobile computing device 408. Alternatively, the feedback management system 400 can be at least partially located at a place of business of an event host, or at a third party that provides remote access, for example via the Internet.

The processor module 502 may include one processor or computer or a plurality of processors or computers. The memory module 504 constitutes an example of one or more network-based non-transitory storage devices and may include one memory element or a plurality of memory elements. The processor module 502 and memory module 504 may be implemented using a distributed computing environment or cloud computing environment.

In some embodiments, the feedback management system 400 can be configured to process a customer requests for event-specific documents, which can include requests to provide feedback related to the event, or which can be any of a variety of different types of documents depending on the type of event. For example, if the event is an airline flight, the document can be any of a variety of flight-related documents, such as a boarding pass, a luggage receipt, or a travel itinerary. If the event is a trade show, the document can be any of a variety of trade-show-related documents, such as an exhibitor or attendee credentials, an exhibitor list, or a workshop schedule. If the event is receiving roadside assistance, the document can be any of a variety of roadside-assistance-related documents, such as a claim form or a proof-of-service document.

The input interface 506 may be configured to receive the document request at or during the event, or some time thereafter. In the illustrated embodiment, the touchscreen monitor 406t on the kiosk 406 serves as an example of an input interface 506. Alternatively, or additionally, the input interface 506 can include any type or form of input device capable of providing input, either computer or human generated, to feedback management system 400. Examples of input devices include, without limitation, a keyboard, a pointing device, a speech recognition device, a computer mouse, a camera, a scanner, a microphone, a touchscreen monitor, variations or combinations of one or more of the same, and/or any other I/O device.

The feedback management system 400 may optionally collect the customer's contact information through the input interface 506, which may be input by the customer 404 or by a customer service attendant associated with the event or the event host. Alternatively, the customer 404 may optionally transfer his contact information electronically to the feedback management system 400, for example via email or using an application on the user's mobile computing device 408. The customer's contact information may optionally be processed by the processor module 502 and stored in the memory module 504. It is to be appreciated that the collection of customer contact information is optional, and in some embodiments, feedback management system 400 may be configured without this functionality.

In some embodiments, the processor module 502 can be configured to provide instructions to the printing terminal 508 for printing, at the event, an event-specific machine-readable code 416 on an event-specific document 418. The event-specific document 418 may be any document that might be provided to an event attendee in connection with the event as described above.

In some embodiments, a feedback database server 434 that includes a server module 322 that can be configured to host an electronic platform that can be accessed by a user via the mobile computing device 408. The electronic platform can be configured to generate an event-specific machine-readable code 416 in electronic form on a display of the mobile computing device 408 or can be printed as described above. The electronic platform can be hosted on the server 434, on mobile computing device 408, or can include distributed modules that are hosted in different locations such that a portion of the electronic platform is hosted by the server 434, and one or more other portions of the electronic platform can be hosted elsewhere, for example on a mobile computing device 408. As a result, various functions of the electronic platform can be performed in a variety of different locations without departing from the scope of the present disclosure. For example, the portion of the electronic platform that generates the event-specific code 416 can be on the server 434 or on the mobile computing device 408, meaning that the event-specific code 416 can be generated at the server 434 or at the mobile computing device 408.

The event-specific machine-readable code 416 may include a decodable instruction for interacting with feedback database server 434 to access an electronic platform configured to provide an event-specific request for information. The event-specific code 416 may be any code known in the art that may be captured by an optical device and/or interpreted by a machine. In some embodiments, the event-specific code 416 may include a bar code, such as a one-dimensional or two-dimensional bar code. The decodable instruction encoded in the event-specific code 416 may include a website address (e.g., URL) where the electronic platform may be accessed.

The instruction in code 416 may be interpreted and executed by the customer's mobile computing device 408, which would allow the customer 404 to interact with the feedback database server 434 to access an electronic platform. The customer's mobile computing device 408 may include but not limited to a smart phone, a PDA, a laptop computer, or any other suitable devices that would allow the customer 404 to interpret the event-specific code 416. To interpret the code 416, the customer's mobile computing device 408 may include commercially available software or software provided by the retailer or a third party. The software may be, not is not limited to, a mobile device application or a computer program.

In some embodiments, the mobile computing device 408 may interact with the feedback database server 434 using any communication protocol known in the art. In an exemplary embodiment, the mobile computing device 408 and the feedback database server 434 may communicate using a remote access protocol known in the art. In another exemplary embodiment, the mobile computing device 408 and the feedback database server 434 may communicate using a "pull" protocol known in the art. The electronic platform may be accessed by the mobile computing device 408 in different ways. In some embodiments, the mobile computing device 408 may include a browser to access the electronic platform using a remote access protocol. In another embodiment, the mobile computing device 408 may include a mobile application and access the electronic platform by hosting it, either partially or entirely, on the mobile computing device 408.

In some embodiments, the mobile computing device 408 is further configured to allow the customer 404 to provide the response data to the feedback database server 434. The response data may include a customized response typed in by the customer 404 and may include the customer's choice of preset options in the event-specific request for information.

The feedback database server 434 may be further configured to receive response data responsive to the event-specific request for information and associate the response data with the event host associated with the event. The response data may optionally be stored in the optional memory module 504 for future access.

The event-specific code 416 may be a unique event-specific code for an event host, such as an event planner, a travel agent, ticket broker, or any other kind of service provider. An event host can have one or more event managers and can offer one or more different types of events. For example, in some embodiments, an event host can be a travel agency that has several travel agents that serve as examples of event managers. A customer who booked a vacation using a certain travel agent can later enter an event-specific event code that is associated with both the customer's itinerary and the specific travel agent who prepared the itinerary. In this case, the feedback from the customer would reflect their event-related experience with the booked vacation and with the travel agent who worked with the customer to prepare the itinerary. In another embodiment some or all event managers may be considered as a single event host and would have the same event-specific code 416. In this case, the feedback from the customer would reflect the event experience without differentiating the different travel agents at the travel agency.

In some embodiments, each venue or type of event may be considered as a different event and would have a different event-specific code 416. In some such embodiments, the feedback from the customer 404 can be specific to events at a specific venue, to events hosted by a specific event host, and/or to events managed by a specific event manager. In some embodiments, some or all venues and/or types of events can be grouped together for purposes of accumulating feedback. In some such embodiments, different events at a specific venue can be treated as a single event and would have the same event-specific code 416.

The term "venue" as used herein can be interpreted broadly for the sake of convenience to include not only static locations, such as music venues for concerts or musical performances, sport venues for sporting events, and theater venues for performing theater, but can include more abstract definitions of a venue, such as a range of locations, non-specific locations, and virtual locations. A range of locations can include such things as travel routes for events involving travel, for example via a train, airplane, ship, bus, or other vehicle. Non-specific locations can include such things as plural disparate locations for events such as conference calls, webinars where at least some attendance occurs remotely, such as via telephone, television, radio, or Internet, from different locations. Virtual locations can include such things as computer-generated environments, for example those associated with massively multiplayer online games where multiple players can compete and interact with each other.

The event-specific request for information can be presented in various forms depending on the purpose for the information requested. In some embodiments, the event-specific request for information may include a customized questionnaire. In some embodiments, the event-specific request for information may include a blank or partially-filled fillable form or both. In an exemplary embodiment, the event-specific request for information may include a menu of preset response options. The use of event-specific code 416 allows for a number of customizations of the questions, including but not limiting to customization based on retailers or retailer locations.

It is to be appreciated that printing the event-specific code 416 or distributing the pre-printed event-specific code 416 at the event helps limit feedback to that which is provided only from actual attending customers 404. In some embodiments, customers can receive the event-specific code 416 without providing their contact information. In some embodiments, the process of collecting the customer's contact information may cause a delay in for the customer 404 and/or other attendees who may be waiting to use the kiosk 406. Additionally, or alternatively, a customer 404 may decline to provide contact information due to privacy concerns or inconvenience that may sometimes be involved. The event-specific code 416 can be provided on an event-specific document 418 that provides for a convenient vehicle for the customer 404 to keep the event-specific code 416 with him so that he can later access the electronic platform at his convenience.

In some embodiments, the event-specific code 416 may be both event-specific and transaction-specific such that a different code 416 may be assigned to each transaction. For example, not only different codes 416 may be assigned to different event hosts, the different transactions at the same event hosts may also be assigned different codes 416. The use of a code 416 that is both event-specific and transaction-specific may have particular synergy in embodiments in which order data is collected as discussed above. In an exemplary embodiment, the transaction-specific and event-specific code 416 may include a decodable instruction for interacting with the processor module 102 to access an electronic platform configured to provide a transaction-specific and event-specific request for information. The use of the transaction-specific and event-specific code 416 allows for a number of customizations of the transaction-specific and event-specific request for information based on the order data. This customization of the transaction-specific and event-specific request for information may be used in a customer service context in which the request for information may be a blank or partially-filled fillable form or both.

As described above, in some embodiments, an event may include attendees who can attend for free and attendees who pay to attend the event. In such embodiments, the kiosk 406 can be positioned near an entrance and can include a POS system such as any POS system described herein, such as POS system 100 or 200. POS system 100 described above. In such embodiments, the kiosk 406 can be configured to process the payment of the entrance fee as a transaction request. Additionally, or alternatively, the feedback management system 400 can be configured to process a transaction request, such as a service request for a service provider, a ticket request for an event host, or a purchase order at a retailer, where a retailer may be any entity that provides services or goods to event attendees during the event at the event location. A transaction request may be associated with any business transaction made in connection with an event, whether associated with the event host, the venue, or other attendees, including both free and paid business transactions. While terms such as "purchase," "register," and "book" are used to provide examples, such examples are not to be construed as being limited to situations where the customer is exchanging money or other consideration for anything.

In some embodiments, the feedback management system 400 can be preconfigured with data representative of the event-specific code 416. Alternatively, the feedback management system 400 can be configured to issue a request for a code, receive the code, and then prepare the code for printing or transmission to a requesting customer 404. For example, the kiosk 406 can be configured to communicate with the network 430, which can be representative of the Internet, via Wi-Fi router 420 and feedback database server 434. In such embodiments, the kiosk 406 can electronically transmit the event information to a feedback database server 434 that can include a server module 322 and an optional memory module 324.

In some embodiments, the server module 322 can be configured with an electronic platform that can respond to the mobile computing device 408 via a Web Browser or specialized application on the mobile computing device 408 at an Internet Protocol (IP) address or URL either represented by the code 416 or that is eventually arrived at after browsing to another IP address or URL represented by the code 416.

In some embodiments, the event-specific code 416 comprises a decodable instruction for interacting with the server module 322 to access an electronic platform configured to provide an event-specific request for information. The instruction in code 416 may be interpreted and executed by the customers' mobile computing device 408, which would allow the customers to interact with the server module 322. The server module 322 is configured to receive response data responsive to the event-specific request for information from the mobile computing devices 408. The server module 322 may associate the response data with the event and store the response data in an optional memory module 324 of the feedback database server 434.

The memory module 324 serves as an example of one or more network-based non-transitory storage devices and can include data related to the event and the event codes. The feedback database server 434 can be configured to respond to requests from the kiosk 406 for event-specific codes.

In some embodiments, the kiosk 406 can include a printing terminal (such as printing terminal 208 described above) for printing the event-specific code 112 on paper or other substrate and dispensing it the printed code for the customer 404. In some embodiments, the kiosk 406 can have access to the Internet. The kiosk 406 can electronically transmit the code 212, 312, 352, or 362 to the customer 404, for example to an email address or via text message to a phone number provided by the customer. In such embodiments, the customer 404 can receive the code on the customer's mobile computing device 408 or other such computing device that also has access to the Internet, for example via cellular data across one or more cellular network towers 410 or via Wi-Fi router 420, the feedback database server 434, and the network 430.

In some embodiments, a position acquisition device 412 can be provided, such as a GPS receiver or a cell phone capable of determining its location using cell phone towers and/or WiFi signals. The position acquisition device 412 can be provided as a stand-alone unit or as a sub-component of another system, such as the feedback system server 424 or the kiosk 406. In embodiments where the position acquisition device 412 includes a GPS receiver, the position acquisition device 412 can be configured to locate a plurality of GPS satellites 414, calculate the distance to a plurality of satellites, and use this calculated information to deduce its own location based on a mathematical principle called trilateration. The position acquisition device 412 is also in communication with the feedback system server 424 to provide location information for the local area network. The kiosk 406 can fetch the location information for use as a location identifier or as a location confirmation. In some embodiments, an event host may be simultaneously hosting multiple events at different locations. The location information can be used to differentiate one event from another in order to get feedback related to specific events. In embodiments that involve travel, where the location changes during the event, the location information can be collected to allow the event host to review the route taken during the event, as well as the timing of the route to review how well an event followed its schedule or itinerary. In some embodiments, an event location may change, for example due to unforeseen problems with the original venue. The location information can serve as a reminder and confirmation weeks or months later about the venue change.

Also, during the event, the feedback database server 434 may be configured as a web server that can respond to requests from customers for updated location information by providing location information from the position acquisition device 412.

In some embodiments, the feedback database server 434 includes a server module 322 configured to respond to the mobile computing device 408 via an electronic platform accessible by the mobile computing device 408 at an Internet Protocol (IP) address or URL either represented by the code 418 or that is eventually arrived at after browsing to another IP address or URL represented by the code 418.

Figure 6:
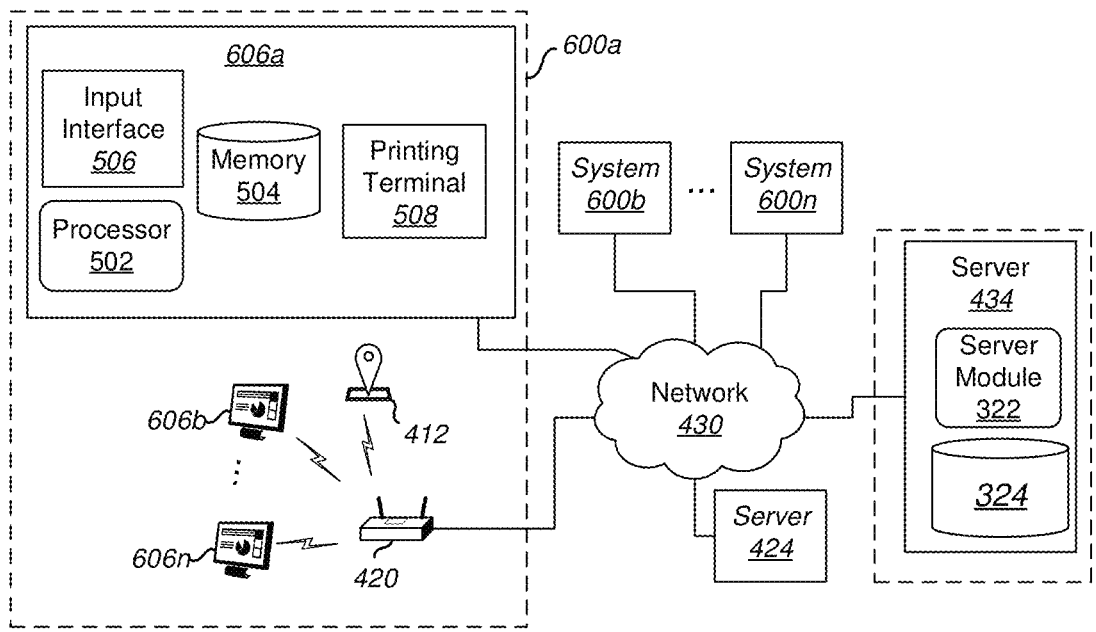
FIG. 6 shows a schematic block diagram of an alternative embodiment of a feedback management system.
Figure 7:
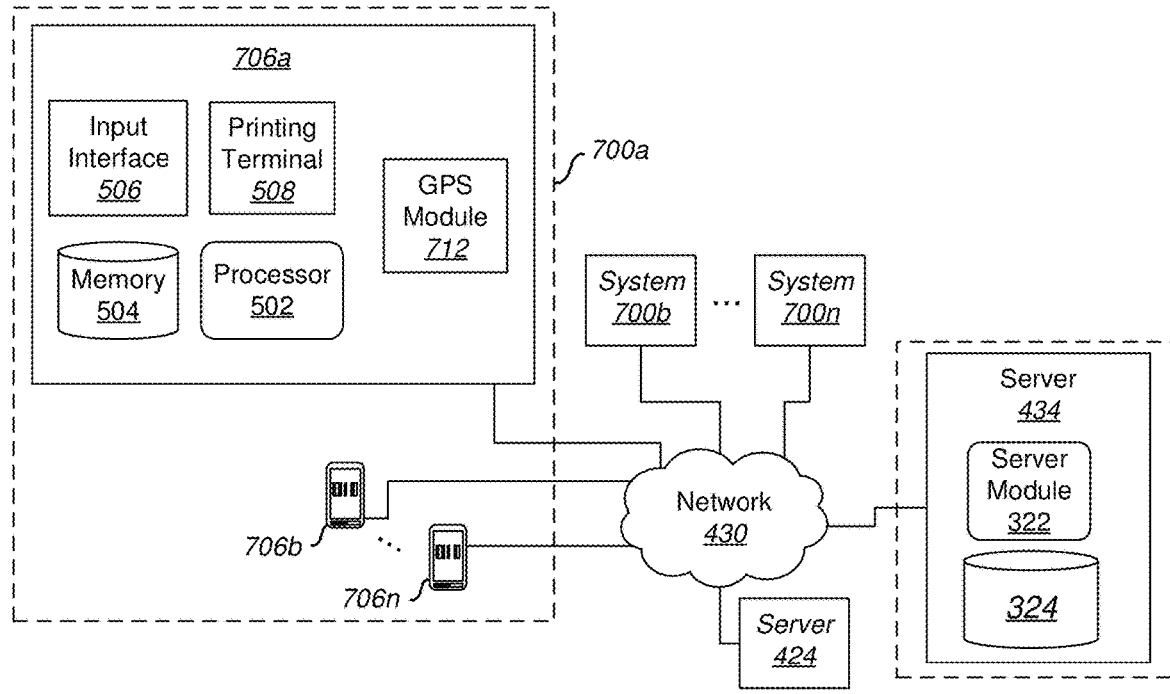
FIG. 7 shows a schematic block diagram of another alternative embodiment of a feedback management system.
Figure 8:
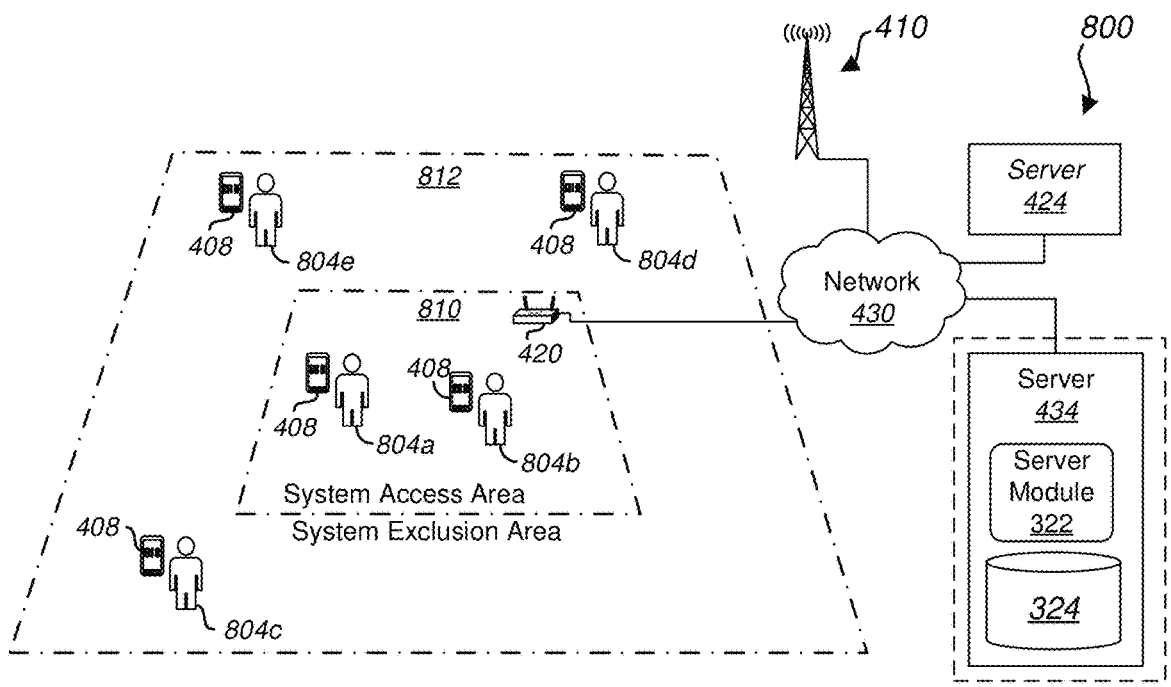
FIG. 8 shows a schematic block diagram of yet another alternative embodiment of a feedback management system.

Turning next to FIGS. 6-8, alternative embodiments of the feedback management system 400 are shown as feedback management systems 600, 700, and 800, respectively.

FIG. 6 shows a schematic block diagram of an alternative embodiment of the feedback management system 600 that includes an alternative embodiment of the device 606, illustrated in FIG. 6 as a touchscreen display 606. More specifically, FIG. 6 shows an embodiment that allows an event host to operate multiple feedback management systems 600a-600n, where n can be any integer and represents a number of feedback management systems 600 in operation for respective events or event venues. The touchscreen display 606 can be configured to communicate independently with the customers' mobile computing devices 408 and with the feedback database server 434 over IP-based computer networks, e.g., via TCP/IP or UDP.

While embodiments of the feedback management system 600 are described as including a device 606 embodied as a touchscreen display 606, alternative embodiments of the device 606 can instead include any electronic device with a display and input device, such as a mobile computing device, for example a smart phone or a tablet computer, a kiosk, or a desktop or laptop computer available for public or customer use, for example in a library or hotel business center.

The processor module 502 can be configured to process customer requests for event-specific documents according to one or more rules for managing access to event records. The input interface 506 may be configured to receive the document requests at or during the event, or some time thereafter, and forward the requests to the processor module 502. The processor module 502 may optionally collect the customer's contact information through either through manual entry or through the input interface 506. The customer's contact information may optionally be processed by the processor module 502 and stored in the memory module 504.

The processor module 502 can be configured to evaluate any applicable access management rules for the requested event records. If any of the rules are not satisfied, the access is denied. Otherwise, if the one or more applicable access management rules are satisfied, access is granted to provide instructions to the printing terminal 508 for printing the event-specific document 418. The processor module 502 can then also provide instructions to the printing terminal 508 for printing an event-specific machine-readable code 416 on an event-specific document 418 or as a separate document. Additionally, or alternatively, the processor module 502 can provide the event-specific machine-readable code 416 electronically to the customer via display 606 or the customers' mobile computing device 408. The event-specific machine-readable code 416 may include decodable instructions for interacting with the feedback database server 434 to access an electronic platform configured to respond to the customer with an event-specific request for information. The decodable instruction encoded in the event-specific code 416 may include a website address (e.g., URL) where the electronic platform may be accessed.

The instruction in code 416 may be interpreted and executed by the customer's mobile computing device 408, which would allow the customer 404 to interact with the feedback database server 434 to access an electronic platform.

The mobile computing device 408 is further configured to allow the customer 404 to provide the response data to the feedback database server 434. The feedback database server 434 may be further configured to receive response data responsive to the event-specific request for information and associate the response data with the event host associated with the event.

The feedback database server 434 can include a web server responsive to HTTP requests, including requests from the customer's mobile computing device 408 made to an IP address or URL related to the event-specific code 416. The request can be such that it is made according to instructions in machine-readable format, which can be an electronic or a hard-copy item. The machine-readable format can include a one-dimensional barcode, a two-dimensional bar code, such as a matrix code or Quick Response (QR) Code, and/or a combination of characters of any kind, a QR code, a bar code, and a combination of characters, such as a grapheme, grapheme-like unit, or symbol, such as in an alphabet or syllabary, for example letters, numerical digits, and punctuation marks. The feedback database server 434 can respond to the request by transmitting predetermined questions or other forms of feedback requests to the customer's mobile computing device 408. The feedback database server 434 can then receive the customer's response data from the customer's mobile computing device via network 430 so that the response data can be stored in memory 324.

The feedback database server 434 can also include a web server responsive to HTTP requests, including requests from the customer's mobile computing device 408 made to an IP address or URL related to the event-specific code 416. The request can be such that it is made according to instructions in machine-readable code. The feedback database server 434 can respond to the request by transmitting predetermined questions or other forms of feedback requests to the customer's mobile computing device 408. The feedback database server 434 can then receive the customer's response data from the customer's mobile computing device 408 and transmit the same to the feedback database server 434 via network 430 so that the response data can be stored in the memory module 324.

FIG. 7 shows a schematic block diagram of another alternative embodiment of the feedback management system 700 that includes another alternative device 706, illustrated in FIG. 7 as a mobile computing device 706, for example a smart phone or a tablet computer. More specifically, FIG. 7 shows an embodiment that allows an event host to operate multiple feedback management systems 700a-700n, where n can be any integer and represents a number of feedback management systems 700 in operation for respective events or event venues. The mobile computing device 706 includes a processor module 502 as discussed in connection with FIG. 6. Also, the mobile computing device 706 includes an integrated position acquisition module 712, which serves the function of position acquisition device 412. Thus, each mobile computing device 706a-706n is operable to communicate independently with the feedback database server 434 as described above in connection with kiosk 606 in FIG. 6, and additionally can independently verify its geographical location without the need for a separate server and GPS receiver, such as feedback system server 424 and position acquisition device 412, shown in FIG. 5.

While embodiments of the feedback management system 700 are described as including a device 706 embodied as a mobile computing device 706, alternative embodiments of the device 706 can instead include any electronic device with a display and input device, such as a kiosk, a touch-screen display, or a desktop or laptop computer available for public or customer use, for example in a library or hotel business center.

Like the position acquisition device 412, the position acquisition module 712 can be configured to locate four or more GPS satellites 414 (shown in FIG. 4), calculate the distance to each located satellite, and use this calculated information to deduce its own location based on a mathematical principle called trilateration. The position acquisition module 712 can also be configured to provide location information for the local area network. The kiosk 706 can fetch the location information for use as a location identifier or as a location confirmation. In some embodiments, an event host may be simultaneously hosting multiple events at different locations. The location information can be used to differentiate one event from another in order to get feedback related to specific events.

In embodiments that involve travel, where the location changes during the event, the location information can be collected to allow the event host to review the route taken during the event, as well as the timing of the route to review how well an event followed its schedule or itinerary. In some embodiments, an event location may change, for example due to unforeseen problems with the original venue. The integrated position acquisition module 712 allows each kiosk 706 to independently gather location information that can serve as a reminder and confirmation weeks or months later about the venue change. Also, during the event, the device 706 may be configured as a web server that can respond to requests from customers for updated location information by providing location information from the position acquisition module 712.

The feedback management system 700 can be configured to process a customer requests for event-specific documents. The input interface 506 may be configured to receive the document request at or during the event, or some time thereafter. The feedback management system 700 may optionally collect the customer's contact information through either through manual entry or through the input interface 506. The customer's contact information may optionally be processed by the processor module 502 and stored in the memory module 504.

The processor module 502 can be configured to provide instructions to the printing terminal 508 for printing, before or during the event, an event-specific machine-readable code 416 on an event-specific document 418. The event-specific machine-readable code 416 may include a decodable instruction for interacting with the processor module 502 to access an electronic platform configured to provide an event-specific request for information. The decodable instruction encoded in the event-specific code 416 may include a website address (e.g., URL) where the electronic platform may be accessed.

The instruction in code 416 may be interpreted and executed by the customer's mobile computing device 408, which would allow the customer 404 to interact with the feedback database server 434 to access an electronic platform.

The mobile computing device 408 is further configured to allow the customer 404 to provide the response data to the feedback database server 434. The feedback database server 434 may be further configured to receive response data responsive to the event-specific request for information and associate the response data with the event host associated with the event.

As described above, the feedback database server 434 can include a web server responsive to HTTP requests, including requests from the customer's mobile computing device 408 made to an IP address or URL related to the event-specific code 416. The request can be such that it is made according to instructions in a machine-readable format, which can be an electronic or a hard-copy item. The machine-readable format can include a one-dimensional barcode, a two-dimensional bar code, such as a matrix code or Quick Response (QR) Code, and/or a combination of characters of any kind, a QR code, a bar code, and a combination of characters, such as a grapheme, grapheme-like unit, or symbol, such as in an alphabet or syllabary, for example letters, numerical digits, and punctuation marks. The feedback database server 434 can respond to the request by transmitting predetermined questions or other forms of feedback requests to the customer's mobile computing device 408. The feedback database server 434 can then receive the customer's response data from the customer's mobile computing device via network 430 so that the response data can be stored in memory 324.

The feedback database server 434 can also include a web server responsive to HTTP requests, including requests from the customer's mobile computing device 408 made to an IP address or URL related to the event-specific code 416. The request can be such that it is made according to instructions in machine-readable code. The feedback database server 434 can respond to the request by transmitting predetermined questions or other forms of feedback requests to the customer's mobile computing device 408. The feedback database server 434 can then receive the customer's response data from the customer's mobile computing device 408 and transmit the same to the feedback database server 434 via network 430 so that the response data can be stored in the memory module 324.

FIG. 8 shows a schematic block diagram of another alternative embodiment of the feedback management system 800. The feedback management system 800 is an example of an embodiment of the feedback management system 800 that allows for the collection of event-specific response data with little or no hardware components of the feedback management system 800 being disposed on-site at the event. For example, compared to some other embodiments disclosed herein, the feedback management system 800 differs in that it does not include a kiosk, GPS receiver, or server at the event. Instead, the present embodiment of the feedback management system 800 allows for the receipt and processing of event-specific response data using remote servers and the like that are accessible via the Internet or other communication network. Instead of customers making requests or communicating with the feedback management system 800 via a kiosk, POS system, or the like, the customer can use their mobile computing device 408, such as a smart phone, tablet, or laptop computer.

It will be recognized that still further embodiments can include a hybrid of the embodiment shown in FIG. 8 and other embodiments where there are any combination of devices 406, 606, 706, GPS receivers 412, and/or servers 424 at an event for use as described herein, while at the same time customers have the option of using their own mobile computing device 408 as described in connection with this embodiment.

In some embodiments, a feedback system server 424 can be provided that includes a web server that is accessible via the network 430, such as the Internet, via IP-based computer networking. In some such embodiments, event attendees can be presented with a request, with or without some form of incentive, to visit a particular website and/or install a particular mobile device application associated with the event or event host or both. For example, promotional material at an event may encourage attendees to install a particular mobile device application or visit a particular website, for example using the customer's mobile computing device 408. In either case, the mobile computing device 408 will direct HTTP requests to a particular IP address or URL hosted by the web server on the feedback system server 424.

The feedback management system 800 can be configured to process a network communication from a customer, which may include, for example, a new-user registration or event-related materials.

The feedback management system 800 may optionally collect the customer's current location information. In some embodiments, for example, the feedback management system 800 may limit solicitation of event-specific response data to approved customers who get approved based on any desired amount of approval criteria, which can include verification that their location coincides with that of the event. For example, as shown in FIG. 8, the feedback management system 800 can establish a geographic region 810 where customers can provide event-specific response data. Thus, customers 804a and 804b located with the system access area 810 will be allowed to provide response data, while users 804c, 804d, and 804e will not receive codes or other such invitations to provide event-specific response data because they are in region 812, which is a system exclusion area because customers in that region do not presently appear to be at the event. It will be appreciated that the criteria for approving customers or customers' feedback can include consideration of any of a wide range of factors in addition to, or instead of, location.

For approved customers, the feedback system server 424 can respond by transmitting an event-specific machine-readable code 416 that may include a decodable instruction for interacting with the feedback database server 434 to access an electronic platform configured to provide an event-specific request for information. The decodable instruction encoded in the event-specific code 416 may include a website address (e.g., URL) where the electronic platform may be accessed.

The instruction in code 416 may be interpreted and executed by the customer's mobile computing device 408, which would allow the customer 404 to interact with the feedback database server 434 to access an electronic platform.

The mobile computing device 408 can further be configured to allow the customer 404 to provide the response data to the feedback database server 434. The feedback database server 434 may be further configured to receive response data responsive to the event-specific request for information and associate the response data with the event host associated with the event.

The feedback database server 434 can also include a web server responsive to HTTP requests, including requests from the customer's mobile computing device 408 made to an IP address or URL related to the event-specific code 416. The request can be such that it is made according to instructions in machine-readable code. The server module can respond to the request by transmitting predetermined questions or other forms of feedback requests to the customer's mobile computing device 408. The processor module 502 can then receive the customer's response data from the customer's mobile computing device and transmit the same to the feedback database server 434 via network 430 so that the response data can be stored in the memory module 324.

Alternatively, the feedback database server 434 can also include a web server responsive to HTTP requests, including requests from the customer's mobile computing device 408 made to an IP address or URL related to the event-specific code 416. The request can be such that it is made according to instructions in machine-readable code. The server module can respond to the request by transmitting predetermined questions or other forms of feedback requests to the customer's mobile computing device 408. The feedback database server 434 can then receive the customer's response data from the customer's mobile computing device 408 and transmit the same to the feedback database server 434 via network 430 so that the response data can be stored in the memory module 324.

Figure 11:
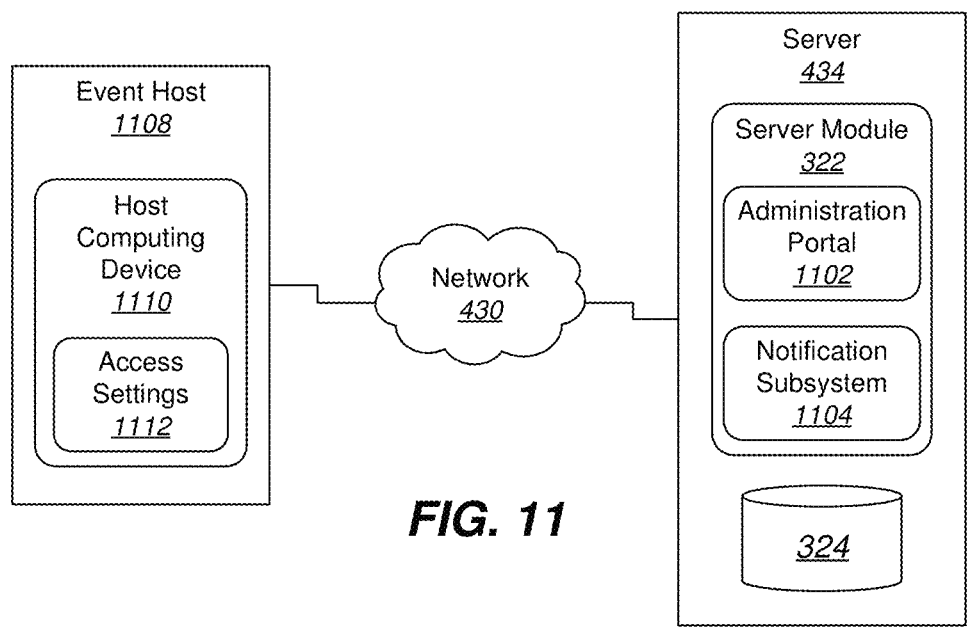
FIG. 11 shows a schematic block diagram of an event host system that can be used with any of the embodiments of the feedback management system.

Any of the embodiments described herein can include notification and access capabilities to allow an event host to receive notification of response data in the memory module 324. Any of the embodiments described herein can also or alternatively include the capability for the event host to offer an incentive for attendees to provide response data. For example, referring to FIG. 11, the server module 322 can include an administration portal 1102 and a notification subsystem 1104 configured for communication with a host computing device 1110 associated with an event host 1108, which is representative of any of the event hosts discussed herein.

The administration portal 1102 can be configured to allow an event host 1108 to set one or more reward conditions for identifying one or more reward recipients from among attendees that provide response data. The server module 322 can be configured to execute the reward conditions, and the memory module 324 can be configured for storing data representative of reward recipients identified by the server module 322 according to the reward conditions.

The reward conditions can include a requirement that the attendee include at least a specified amount of response data. For example, the request for response data may include required and optional questions, and the reward conditions can include requiring that the attendee at least respond to all of the required questions. The reward conditions can include a requirement that the reward recipient be randomly chosen from among attendees that provided response data. For example, the request for response data may include an indication that attendees who provide response data will be provided with a chance to receive a reward that will only be given to some percentage of all attendees who provide response data. For example, on attendee from among all attendees who provide response data will win some reward, such as airline miles or a bottle of wine. The reward conditions can include a requirement that the reward be randomly chosen from among a plurality of possible outcomes for providing response data. For example, the request for response data may include an indication that attendees who provide response data will have a chance to receive a reward. For example, attendees who provide response data can have a chance that is less than a 100% chance at receiving some reward, such as airline miles or a bottle of wine.

The server module 322 can be configured to provide the data representative of reward recipients to the event host 1108 according to at least one of a batch processing procedure, a real-time processing procedure, and a near-real-time processing procedure. The server module 322 can also be configured to provide reward redemption information to attendees regarding a reward to the reward recipient. For example, attendees who receive a reward can be notified that they have received the reward and can be requested to provide information, such as name, phone number, email address, or other identifying information to allow for confirmation that the reward is provided to the proper person.

The administration portal 1102 can be configured to allow an event host 1108 to access the response data in the database hosted by the memory module 324. The event host 1108 can be alerted when there is response data available by the notification subsystem 1104. The notification subsystem 1104 can be configured for sending a notification to the event host 1108 when response data associated with an event hosted by the event host 1108 has been stored in the memory module 324.

In some embodiments, the electronic platform described herein can include portions thereof that are distributed among multiple systems such that the server module 322 and the host computing device 1110 both host respective portions of the electronic platform. The server module 322 can be configured to host a first portion of the electronic platform configured to cooperate with a second portion of the electronic platform hosted by the host computing device 1110. In such embodiments, the portion of the electronic platform hosted by the host computing device 1110 can be configured the notifications when response data associated with an event hosted by the event host 1108 has been stored in the memory module 324. In such embodiments, the administration portal 1102 can be accessible by the portion of the electronic platform hosted by the host computing device 1110. In some embodiments, the administration portal 1102 can be hosted by the host computing device 1110 instead of by the server module 322. In still further embodiments, the administration portal 1102 distributed among multiple systems such that the server module 322 and the host computing device 1110 both host respective portions of the administration portal 1102.

The administration portal 1102 can be configured to provide a plurality of access settings 1112 corresponding to a plurality of members of the event host 1108. For example, there can be members of the event host 1108 that have different levels of authority, such as read-level users who can only read information, write-level users who can read information and make some changes to information, and administrative-level users who have read and write level privileges, and can create new users, cancel the account, make payments, or any other task.

Figure 9:
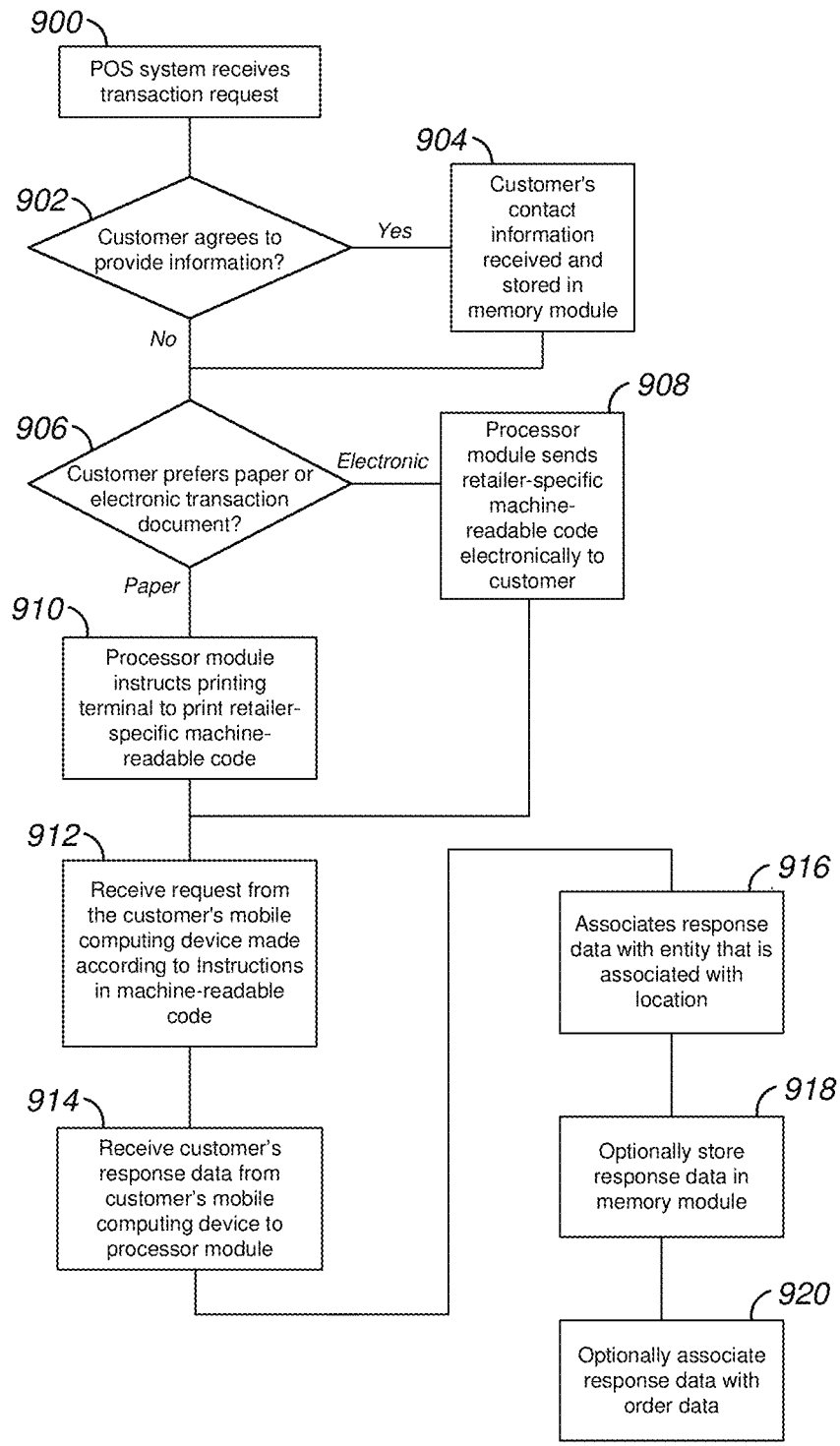
FIG. 9 is a flow diagram of an example computer-implemented method for processing purchase orders and collecting retailer-specific response data.

FIG. 9 is a flow diagram of an example computer-implemented method for processing purchase orders and collecting retailer-specific response data. The steps shown in FIG. 9 may be performed by any suitable computer-executable code and/or computing system, including POS system 100 in FIG. 1, system 250 in FIG. 2, system 350 in FIG. 3, and embodiments of and/or variations or combinations of one or more of the other embodiments combined with a disclosed POS system.

As illustrated in FIG. 9, at step 900 one or more of the POS systems described herein may receive a transaction request from a customer. Next, at step 902, the customer is given the option of providing personal contact information. If the customer agrees, the information is collected at step 904. Then at step 906, the customer is given the option of receiving documents electronically or in paper. If electronically is selected, then at step 908 the processor module 102 sends retailer-specific machine-readable code electronically to the customer. Otherwise, at step 910, the processor module 102 instructs the printing terminal 108 to print retailer-specific machine-readable code 112. In some embodiments, the machine-readable code can comprise location information representative of a POS location, retailer location, event, or event location.

Next, at step 914, the processor module 102 receives the customer's response data from customer's mobile computing device. Then, at step 916, the processor module 102 associates the response data with entity that is associated with a location, such as a retailer location. Finally, steps 918 and 920 show optional steps of storing the response data in a memory module, and associating response data with order data, if available.

Figure 10:
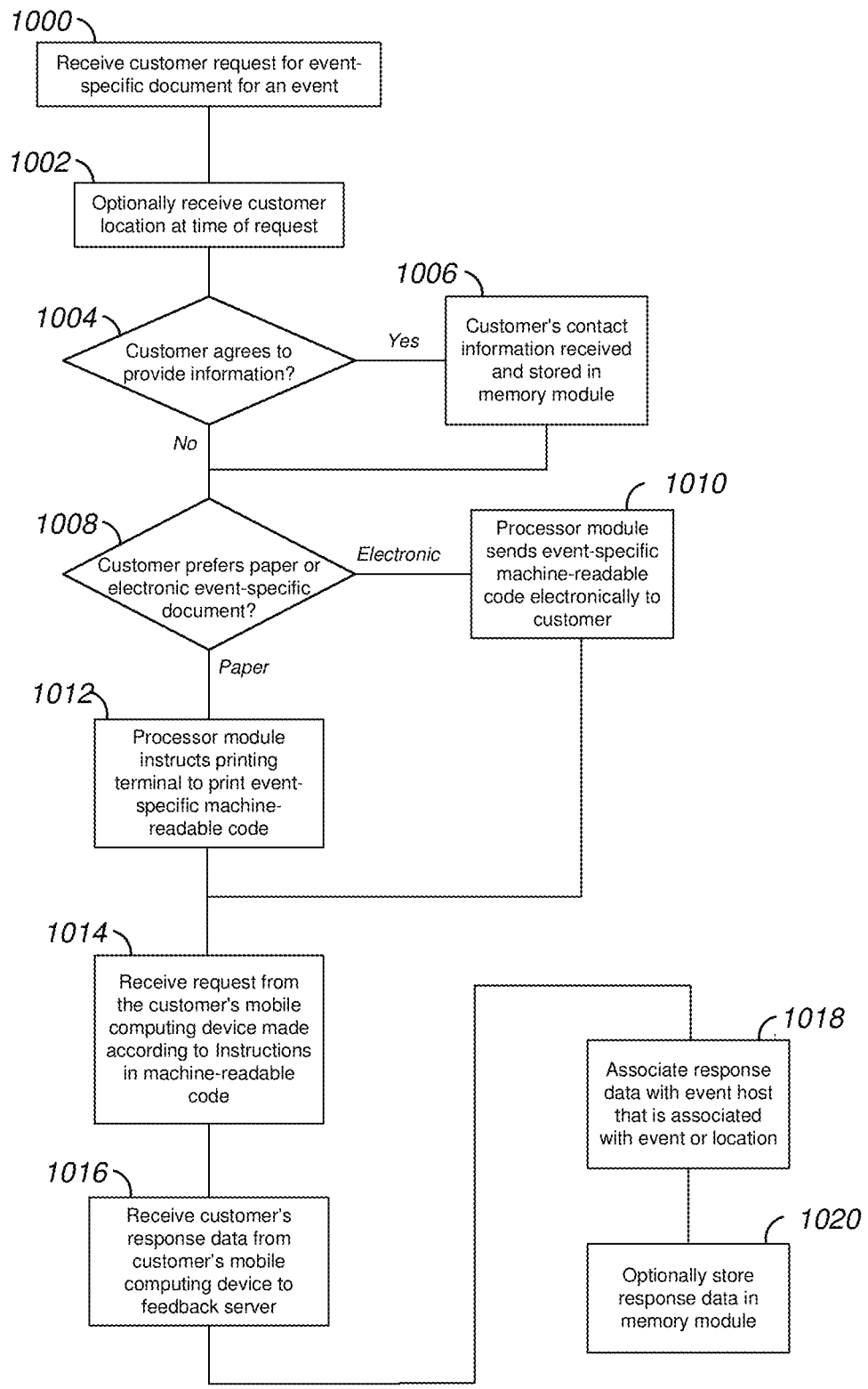
FIG. 10 is a flow diagram of an example computer-implemented method for processing document requests and collecting event-specific response data.

FIG. 10 is a flow diagram of an example computer-implemented method for processing document requests and collecting event-specific data. purchase orders and collecting retailer-specific response data. The steps shown in FIG. 10 may be performed by any suitable computer-executable code and/or computing system, including feedback management systems 400, 600, 700, and 800 as discussed herein and embodiments of and/or variations or combinations of one or more of the other embodiments combined with a disclosed POS system.

As illustrated in FIG. 10, at step 1000 one or more of the feedback management systems disclosed herein described herein may receive a document transaction request from a customer. Next, at step 1002, in some embodiments, or at the customer's option, the feedback management system collects the customer's current location. Next, at step 1004 the customer is given the option of providing personal contact information. If the customer agrees, the information is collected at step 1006. Then at step 1008, the customer is given the option of receiving documents electronically or in paper. If electronically is selected, then at step 1010 the processor module 102 sends retailer-specific machine-readable code electronically to the customer. Otherwise, at step 1012, the processor module 102 instructs the printing terminal 108 to print retailer-specific machine-readable code 112.

Next, at step 1014, the feedback database server 434 receives a request from the customer's feedback management system made according to instructions in machine-readable code. Then at step 1016, the feedback database server 434 receives the customer's response data from customer's mobile computing device. Then, at step 1018, the feedback database server 434 associates the response data with entity that is associated with a location, such as a retailer location. Finally, step 1020 the feedback management system optionally stores response data in a database or memory module 324.

A computing device, communication device, or capturing device may be a virtual machine, computer, node, instance, host, or machine in a networked computing environment. Also, as referred to herein, a network or cloud may be a collection of machines connected by communication channels that facilitate communications between machines and allow for machines to share resources. Network may also refer to a communication medium between processes on the same machine. Also, as referred to herein, a network element, node, or server may be a machine deployed to execute a program operating as a socket listener and may include software instances.

Resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

A network or cloud may include, but is not limited to, computing grid systems, distributed computing environments, cloud computing environment, etc. Such network or cloud includes hardware and software infrastructures configured to form a virtual organization comprised of multiple resources which may be in geographically disperse locations.

Although various computer elements, communication devices and capturing devices have been illustrated herein as single device or machine, such elements may operate over several different physical machines, or they may be combined as operating code instances running on a single physical machine. The claims in the present application comprehend such variation in physical machine configurations.

Servers and server modules disclosed herein, including server subsystem 220, server module 222, server 424, and server 434 can include functionality and be configured to operate as a web server. The web server provides access to response data through open Internet standards. Web server may serve both web pages and XML service calls, and it may include Simple Object Access Protocol (SOAP) and Secure Socket Layer (SSL) servers. The SSL server may provide a secure two-way authentication between a client and a server or a secure one-way authentication from a server to a client.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result. Words relating to relative position of elements such as "about," "near," "proximate to," and "adjacent to" shall mean sufficiently close to have a material effect upon the respective system element interactions.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure but should not be constrained by the headings herein.

What is claimed is:

1. A method of managing feedback comprising:
    storing an event record about an event in one or more network-based non-transitory storage devices having a collection of event records stored thereon;
    storing criteria including one or more rules for managing access to, and distribution of, the event records, wherein a first rule of the one or more rules applies to the event record;
    upon receiving a request by a user for approval for remote access to the event record, evaluating whether the request satisfies the criteria including the first rule;
    if the first rule is not satisfied, denying the user access to the event record;
    if the criteria including the first rule is satisfied, granting the user access to the event record, including sending an event-specific machine-readable code to the user,
    wherein the event-specific machine-readable code comprises an interpretable instruction for a mobile device to interact with the server module to access an electronic platform using a remote access protocol to receive an event-specific questionnaire from the electronic platform, and provide response data responsive to the event-specific questionnaire to the server module.

2. The method of claim 1, wherein the event record includes location information that includes at least one geographical region.

3. The method of claim 2, further comprising receiving location information from the user.

4. The method of claim 3, wherein the evaluating of the first rule includes determining whether the user is at the event based on the received location information received from the user and determining whether the received location information is within the at least one geographical region of the event.

5. The method of claim 1, further comprising receiving contact information for the user.

6. The method of claim 5, wherein the sending of the event-specific machine-readable code to the user includes sending the code in electronic form via at least one of an email, a Short Message Service (SMS) text message, a Multimedia Messaging Service (MMS) text message, an Instant Messaging (IM) message, or an "Over the Top" (OTT) application message.

7. A feedback management system, comprising:
one or more network-based non-transitory storage devices for storing: an event record about an event, the storage devices having a collection of event records stored thereon; and
criteria including one or more rules for managing access to, and distribution of, the event records, wherein a first rule applies to the event record;
a server for receiving a request by a user for approval for remote network access to the event record;
one or more processors for:
evaluating whether the request satisfies the criteria including the first rule;
if the first rule is not satisfied, denying the user access to the event record;
if the criteria including the first rule is satisfied, granting the user access to the event record, including sending an event-specific machine-readable code to the user,
wherein the event-specific machine-readable code comprises an interpretable instruction for a mobile device to interact with the server module to access an electronic platform using a remote access protocol to receive an event-specific questionnaire from the electronic platform, and provide response data responsive to the event-specific questionnaire to the server module.

8. The system of claim 7, wherein the event record includes location information that includes at least one geographical region.

9. The system of claim 8, further comprising receiving location information from the user.

10. The system of claim 9, wherein the evaluating of the first rule includes determining whether the user is at the event based on the received location information received from the user and determining whether the received location information is within the at least one geographical region of the event.

11. The system of claim 7, wherein the one or more processors is configured for further comprising receiving contact information for the user.

12. The system of claim 11, wherein the sending of the event-specific machine-readable code to the user includes sending the code in electronic form via at least one of an email, a Short Message Service (SMS) text message, a Multimedia Messaging Service (MMS) text message, an Instant Messaging (IM) message, or an "Over the Top" (OTT) application message.

13. A feedback management system comprising:
an event-host subsystem accessible to an attendee of an event, the event-host subsystem comprising a processor being configured to:
receive an event-related request from the attendee, and provide, to the attendee, a response to the event-related request; and
provide, to the attendee, an event-specific machine-readable code with the response to the event-related request;
wherein the event-specific machine-readable code comprises an interpretable instruction for a computing device to interact with a remote server to access an electronic platform using a remote access protocol, the electronic platform configured to request response data responsive to a request for attendee input and associate the response data with the event.

14. The system of claim 13, wherein the electronic platform is configured to request the response data by presenting a questionnaire in connection with the event, the questionnaire being event-specific, transaction specific, or both.

15. The system of claim 13, wherein the processor further is configured to provide an electronic copy of the event-specific machine-readable code.

16. The system of claim 13, the event-host subsystem further comprising a printing terminal for printing the event-specific machine-readable code on a transaction document.

17. The system of claim 13, wherein the event-host module includes an attendee interface comprising at least one of a kiosk, a touchscreen display, and a mobile computing device.

18. The system of claim 17, wherein the attendee interface comprises a mobile computing device having a position acquisition device configured to determine a location of the mobile computing device.

19. The system of claim 18, wherein the event-specific machine-readable code further comprises interpretable location information based on the location of the mobile computing device.

20. The system of claim 18, wherein the electronic platform is further configured associate the response data with the location of the mobile computing device.

21. The system of claim 18, wherein the event includes traveling such that an event location changes during the event.

22. The system of claim 21, wherein the position acquisition device collects location information as the event location changes during the event, thereby generating an event route, and wherein the electronic platform is further configured associate the response data with the event route.

23. A server system for collecting event-specific response data, the system comprising:
a server module that hosts at least a portion of an electronic platform, the electronic platform being accessible by a mobile computing device interpreting an event-specific machine-readable code, the event-specific machine-readable code comprises an interpretable instruction for interacting with the server module using a remote access protocol, the electronic platform being configured to request response data responsive to a request for attendee input; and
a memory module for storing the response data in a database, the response data being associated in the database with the event.

24. The system of claim 23, wherein the event-specific machine-readable code comprises location information, the location information being representative of an event location.

25. The system of claim 23, wherein the machine-readable code is provided electronically to the mobile computing device.

26. The system of claim 23, wherein the machine-readable code comprises at least one of a one-dimensional barcode, a two-dimensional bar code, and a combination of characters.

27. The system of claim 23, wherein the server module is configured to host a first portion of the electronic platform, and wherein the first portion of the electronic platform hosted by the server module is configured to cooperate with a second portion of the electronic platform hosted by the mobile computing device.

28. The system of claim 23, wherein the electronic platform further comprises an administration portal for allowing an event host to set one or more reward conditions for identifying one or more reward recipients from among attendees that provided response data,
wherein the server module is configured to execute the reward conditions, and the memory module is configured for storing data representative of the one or more reward recipients identified by the server module according to the reward conditions.

29. The system of claim 28, wherein at least one of the one or more reward recipients is notified of winning a reward in a real-time or deferred manner.

30. The system of claim 28, wherein the server module is configured to provide the data representative of reward recipients to the event host according to at least one of a batch processing procedure, a real-time processing procedure, and a near-real-time processing procedure.

31. The system of claim 28, wherein the server module is configured to provide reward redemption information to the one or more reward recipients.

32. The system of claim 23, wherein the server module comprises a notification subsystem for ending a notification to the event host when the response data has been stored in the database.

33. The system of claim 23, wherein the electronic platform further comprises an administration portal for allowing an event host to access the response data in the database.

34. The system of claim 33, wherein the server module is configured to host a first portion of the electronic platform, and wherein the first portion of the electronic platform hosted by the server module is configured to cooperate with a second portion of the electronic platform hosted by a host computing device, the host computing device configured to receive the notification.

35. The system of claim 34, wherein the administration portal is included in the second portion of the electronic platform hosted by the host computing device.

36. The system of claim 31, wherein the administration portal is configured to provide a plurality of access settings corresponding to a plurality of members of the event host.

* * * * *